United States Patent
Takahashi et al.

(10) Patent No.: US 6,260,027 B1
(45) Date of Patent: Jul. 10, 2001

(54) ELECTRONIC TICKET SYSTEM, COLLECTING TERMINAL, SERVICE PROVIDING TERMINAL, USER TERMINAL, ELECTRONIC TICKET COLLECTING METHOD AND RECORDING MEDIUM

(75) Inventors: Yoshio Takahashi; Hidemi Moribatake, both of Tokyo (JP)

(73) Assignees: NTT Data Corporation; Nippon Telegraph & Telephone Corporation, both of Tokyo (JP)

( * ) Notice: Subject to any disclaimer, the term of this patent is extended or adjusted under 35 U.S.C. 154(b) by 0 days.

(21) Appl. No.: 09/175,198

(22) Filed: Oct. 20, 1998

(30) Foreign Application Priority Data

Jan. 27, 1998 (JP) .................................. 10-013949

(51) Int. Cl.$^7$ .................................................... A61N 21/00
(52) U.S. Cl. ................................. 705/69; 705/64; 705/65
(58) Field of Search .................. 705/69, 64, 65

(56) References Cited

U.S. PATENT DOCUMENTS

| | | | |
|---|---|---|---|
| 4,977,595 | * 12/1990 | Ohta et al. | 705/69 |
| 5,305,383 | * 4/1994 | Guillou et al. | 705/66 |
| 5,461,217 | * 10/1995 | Claus | 235/380 |
| 5,511,121 | * 4/1996 | Yacobi | 705/69 |
| 5,590,197 | * 12/1996 | Chen et al. | 705/65 |
| 5,677,955 | * 10/1997 | Doggett et al. | 705/76 |
| 5,778,067 | * 7/1998 | Jones et al. | 705/65 |
| 5,799,087 | * 8/1998 | Rosen | 705/69 |
| 5,813,510 | * 9/1998 | Rademacher | 194/206 |
| 5,832,089 | * 11/1998 | Kravitz et al. | 705/69 |
| 5,878,138 | * 3/1999 | Yacobi | 705/69 |
| 5,898,154 | * 4/1999 | Rosen | 235/379 |
| 5,905,976 | * 5/1999 | Mjolsnes et al. | 705/39 |
| 5,920,629 | * 7/1999 | Rosen | 705/69 |
| 5,940,510 | * 8/1999 | Curry et al. | 705/65 |
| 5,949,880 | * 9/1999 | Curry et al. | 705/66 |

FOREIGN PATENT DOCUMENTS

8115389 * 5/1996 (JP) ............................. G06K/17/00

OTHER PUBLICATIONS

Grygo, Eugene, "Postal Service Delivers Online", Infoworld, vol. 21, Issue 52/01, 2 pages, Jan. 2000.*

* cited by examiner

Primary Examiner—Tod R. Swann
Assistant Examiner—James W. Myhre
(74) Attorney, Agent, or Firm—Baker & McKenzie

(57) ABSTRACT

A collecting agency supplies a collecting agency name and a money bag number to a service providing terminal. In response to dealing requests from user terminals, the service providing terminal sends, to the user terminals, information which contains the collecting agency name (Id) and the money bag number (Gb) supplied from the collecting agency. The user terminals generate digital signatures containing the received request information, affix the generated signatures to electronic tickets to be used, and send the electronic tickets with the signatures to the service providing terminal. The service providing terminal, which has received the used electronic tickets, collects those electronic tickets which include the same money bag number supplied from the collecting agency into a group (a money bag), and sends the group of electronic tickets to the collecting agency.

54 Claims, 9 Drawing Sheets

ELECTRONIC TICKET SYSTEM, COLLECTING TERMINAL, SERVICE PROVIDING TERMINAL, USER TERMINAL, ELECTRONIC TICKET COLLECTING METHOD AND RECORDING MEDIUM

BACKGROUND OF THE INVENTION

1. Field of the Invention

The present invention relates to an electronic ticket system, a collecting terminal, a service providing terminal, a user terminal, an electronic ticket collecting method and a recording medium, all being for use in a system which utilizes electronic tickets and all being capable of preventing illegal actions such as copying an electronic ticket and information concerning its use, etc.

2. Description of the Related Art

Of late, an electronic ticket system which carries out transactions through the use of electronic tickets has been proposed.

In the above system, an issuing agency issues an electronic ticket to a user, and the user sends the electronic ticket to a service providing agency when he/she uses the electronic ticket, in order to request services, etc. from the service providing agency. The used electronic ticket, which the service providing agency has received from the user, is collected by a collecting agency or the like, and is returned to the issuing agency. Simultaneously, the charge for the electronic ticket as used and returned to the issuing agency is paid to the service providing agency.

In order to find out any illegal actions beforehand, it has been planned to send to the issuing agency the to-be-used electronic ticket which the service providing agency has received from the user, and to provide the user with services after the electronic ticket is authenticated. In this case, however, online reference transactions have to be made each time the user uses such an electronic ticket, and the processing speed is low accordingly.

Furthermore, there is the possibility that any unjust service providing agency, for example, may copy the used electronic ticket received from the user and send its copies to the collecting agency in order to unjustly charge a large amount of money.

There is a plan to store data in a highly tamperproof storage device as a countermeasure against the illegal action of copying important data without permission. In this case, as regards the electronic ticket which the user has, the illegal copying action can be prevented by storing data in an IC card or the like. However, since the service providing agency receives electronic tickets from individual users and the collecting agency collects used electronic tickets from the service providing agency, a huge number of electronic tickets are concentrated at the service providing agency and the collecting agency. Under this condition, an IC card or the like is not sufficient to store huge data, and a highly tamperproof specific storage device having a large capacity is necessary.

Not only electronic tickets having a monetary value, but also other various tickets involve such problems.

The present invention has been made in consideration of the above circumstances, and it is an object of the present invention to provide a quick-response electronic ticket system, a collecting terminal, a service providing terminal, a user terminal, an electronic ticket collecting method and a recording medium, all being capable of preventing the illegal action of copying an electronic ticket and information concerning its use, without requiring any specific hardware.

SUMMARY OF THE INVENTION

According to the first aspect of the present invention having the above object, there is provided an electronic ticket system comprising:

at least one user terminal which stores an electronic ticket;

at least one service providing terminal for performing a deal with the at least one user terminal; and a financial agency in which the electronic money after used for the deal is deposited;

wherein the at least one service providing terminal includes sending means for sending challenge information which differ depending on deals to the at least one user terminal in response to a dealing request therefrom, and the at least one user terminal includes acquiring means for acquiring, before the deal, account information identifying an account which the at least one service providing terminal has opened with the financial agency and in which the electronic ticket is deposited, generating means for generating an assignment which specifies an electronic ticket's monetary amount, an electronic ticket's destination which is the account identified by the acquired account information, and a dealing ID code including the challenge information sent to the at least one user terminal, and ticket sending means for affixing the generated assignment to the electronic ticket to be used for the deal and sending the electronic ticket with the assignment to the at least one service providing terminal.

According to the above-described structure, the electronic ticket after utilized for the deal does not have any other use than being deposited in the account in the financial agency which the assignment affixed to the electronic ticket specifies. Consequently, the illicit use of the electronic ticket is avoided.

According to the second aspect of the present invention, there is provided an electronic ticket system for collecting electronic tickets in accordance with money bag numbers serving as collection ID information, comprising:

user terminals which store the electronic tickets;

at least one service providing terminal for performing deals with the user terminals; and at least one collecting terminal for collecting the electronic tickets after used for the deals; and wherein the at least one service providing terminal includes request information sending means for sending request information to the user terminals in response to dealing requests therefrom, the request information containing a collecting terminal ID code which identifies the at least one collecting terminal, and a money bag number which serves as the collection ID information, each of the user terminals includes signature generating means for generating a digital signature which contains the request information sent from the at least one service providing terminal, and ticket sending means for affixing the signature generated by the signature generating means to an electronic ticket to be used for a deal and for sending the electronic ticket with the generated signature to the at least one service providing terminal, and the at least one service providing terminal includes used ticket sending means for collecting, of the electronic tickets sent from the used terminals, electronic tickets with digital signatures containing identical money bag numbers, and for sending the collected electronic tickets to the at least one collecting terminal which is identified by the collecting terminal ID code contained in the digital signatures.

According to the above-described structure, a user terminal before a deal acquires information concerning the collecting terminal, by which an electronic ticket after used is to be collected, and the to-be-collected group (the money bag number) to which the electronic money belongs, etc. The user terminal affixes the acquired information to the to-be-used electronic ticket, and sends the electronic ticket with the acquired information to the service providing agency. The electronic ticket after used is collected in accordance with the information affixed thereto. Even if the electronic ticket should be collected improperly by an illegal action such as stealing or the like, the illegality can be easily detected by reference to the information affixed to the electronic ticket.

The at least one collecting terminal may include supplying means for supplying the collecting terminal ID code and the money bag number to the at least one service providing terminal.

The supplying means of the at least one collecting terminal may include storage means for storing the money bag number which the supplying means has sent to the at least one service providing terminal; and the at least one collecting terminal may further include money bag number checking means for checking, by reference to the storage means, whether the money bag numbers, contained in the digital signatures affixed to the electronic tickets collected and sent from the at least one service providing terminal, are identical with the money bag number sent to the at least one service providing terminal and have not been used before, and ticket checking means for checking whether the electronic tickets collected and sent from the at least one service providing terminal include no identical electronic tickets.

According to the above structures, only the used electronic tickets having the proper money bag number affixed thereto are collected. Furthermore, any illegal action on the part of the service providing terminal, such as making and using copies of the electronic tickets collected this time or before then is prevented. Moreover, since it can be checked in an offline state whether the collected electronic tickets are proper, the response of the system is improved.

The at least one service providing terminal may include a plurality of service providing terminals which are hierarchically arranged in the first to m-th levels (m is a natural number);

of the plurality of service providing terminals, the first level service providing terminal located in the first level in hierarchy may include means for supplying, to the second level service providing terminals located in the second level in hierarchy, the collecting terminal ID code and the money bag number supplied from the at least one collecting terminal;

each of n-th level service providing terminals located in an n-th level in hierarchy (n is a natural number given as 2≦n≦m−1) may include means for affixing an n-th level terminal ID code identifying each n-th level service providing terminal to the money bag number supplied from the corresponding (n−1)-th level service providing terminal located in an (n−1)-th level in hierarchy, and supplying the money bag number having the n-th level terminal ID code assigned thereto to the corresponding (n+1)-th level service providing terminal(s) located in an (n+1)-level in hierarchy as an n-th level terminal money bag number assigned to each n-th level service providing terminal, together with the collecting terminal ID code;

each of m-th level service providing terminals located in an m-th level in hierarchy may include request information sending means for affixing an m-th level terminal ID code identifying each m-th level service providing terminal to the money bag number supplied from the corresponding (m−1)-level service providing terminal located in an (m−1)-th level in hierarchy, thereby generating an m-th level terminal money bag number assigned to each m-th level service providing terminal, and for supplying request information containing the collecting terminal ID code and the generated money bag number to one of the user terminals in response to a dealing request therefrom;

each n-th level service providing terminal may further include means for collecting from the corresponding (n+1)-th level service providing terminal(s) the electronic tickets with digital signatures including the n-th level terminal money bag number after the m-th level service providing terminals have performed deals with the user terminals, and for sending the collected electronic tickets to the corresponding (n−1)th level service providing terminal; and the first level service providing terminal may further include means for collecting from the second level service providing terminals the electronic tickets with digital signatures including the money bag number which the first level service providing terminal has sent to the second level service providing terminals, and for sending the collected electronic tickets to the at least one collecting terminal which is identified by the collecting terminal ID code contained in the digital signatures affixed to the collected electronic tickets.

With the above structures, hierarchically arranged service providing terminals are realized.

The at least one collecting terminal may include a plurality of collecting terminals which are hierarchically arranged in first to m-th levels (m is a natural number);

of the plurality of collecting terminals, the first level collecting terminal located in the first level in hierarchy includes means for supplying, to the second level collecting terminals located in the second level in hierarchy, a collecting terminal ID code which identifies the first level collecting terminal and a collection money bag number which serves as collection ID information;

each of n-th level collecting terminals located in an n-th level in hierarchy (n is a natural number given as 2≦n≦m−1) may include means for affixing an n-th level terminal ID code identifying each n-th level collecting terminal to the collection money bag number supplied from the corresponding (n−1)-th level collecting terminal located in an (n−1)-th level in hierarchy, and for supplying the collection money bag number having the n-th level terminal ID code affixed thereto to the corresponding (n+1)-th collecting terminal(s) located in an (n+1)-level in hierarchy as an n-th level terminal collection money bag number assigned to each n-th level collecting terminal, together the collecting terminal ID code;

each of m-th level collecting terminals located in an m-th level in hierarchy may include means for affixing an m-th level terminal ID code identifying each m-th level collecting terminal to the collection money bag number supplied from the corresponding (m−1)-th level collecting terminal located in an (m−1)-th level in hierarchy, and for supplying as the money bag number the collection money bag number having the m-th level terminal ID code affixed thereto to the service providing terminal, together with the collecting terminal ID code;

each n-th level collecting terminal may further include means for collecting from the corresponding (n+1)-th collecting terminal(s) the electronic tickets with digital signatures including the n-th level terminal collection money bag number after the m-th level collecting terminals have received the electronic tickets from the service providing terminal, and for sending the collected electronic tickets to the corresponding (n−1)-th level collecting terminal; and the first level collecting terminal may collect from the second level collecting terminals the electronic tickets with digital signatures including the collection money bag number which the first level collecting terminal has sent to the second level collecting terminals.

With the above structures, hierarchically arranged collecting terminals are realized.

According to the third aspect of the present invention, there is provided an electronic ticket system for collecting electronic tickets in accordance with money bag numbers serving as collection ID information, comprising:

user terminals which store the electronic tickets;

at least one service providing terminal for performing deals with the user terminals; and at least one collecting terminal for collecting the electronic tickets after used for the deals;

wherein the at least one collecting terminal includes supplying means for supplying a collecting terminal ID code identifying the at least one collecting terminal to the at least one service providing terminal, and generating means for generating a money bag number which indicates the collection ID information in accordance with a predetermined rule, the at least one service providing terminal includes request information sending means for generating a money bag number in accordance with a rule identical with the predetermined rule of the at least one collecting terminal and for sending request information, which contains the generated money bag number and the collecting terminal ID code supplied from the at least one collecting terminal, to the user terminals in response to dealing requests therefrom, each of the user terminals includes signature generating means for generating a digital signature containing the request information sent from the at least one service providing terminal, and ticket sending means for affixing the signature generated by the signature generating means to an electronic ticket to be used for a deal and for sending the electronic ticket with the generated signature to the at least one service providing terminal, and the at least one service providing terminal includes used ticket sending means for collecting, of the electronic tickets sent from the used terminals, electronic tickets with digital signatures containing identical money bag numbers, and for sending the collected electronic tickets to the at least one collecting terminal which is identified by the collecting terminal ID code contained in the digital signatures.

According to the above structures, a user terminal before a deal acquires information concerning the collecting terminal, by which an electronic ticket after used is to be collected, and the to-be-collected group (the money bag number) to which the electronic money belongs, etc. The user terminal affixes the acquired information to the to-be-used electronic ticket, and sends the electronic ticket with the acquired information to the service providing terminal. The electronic ticket after used is collected in accordance with the information affixed thereto. Even if the electronic ticket should be collected improperly through an illegal action such as stealing or the like, the illegal action can be easily detected by reference to the information affixed to the electronic ticket.

The at least one collecting terminal may further include money bag number checking means for checking whether the money bag numbers, contained in the digital signatures affixed to the electronic tickets collected and sent from the service providing terminal, have not been used before and are identical with the money bag number which the generating means has generated in accordance with the predetermined rule, and ticket checking means for checking whether the electronic tickets collected and sent from the service providing terminal include no identical electronic tickets.

The at least one service providing terminal may include a plurality of service providing terminals which are hierarchically arranged in first to m-th levels (m is a natural number);

of the plurality of service providing terminals, the first level service providing terminal located in the first level in hierarchy may include means for supplying, to the second level service providing terminals located in the second level in hierarchy, the money bag number generated in accordance with the rule identical with the predetermined rule of the at least one collecting terminal, and the collecting terminal ID code supplied from the at least one collecting terminal;

each of n-th level service providing terminals located in an n-th level in hierarchy (n is a natural number given as $2 \leq n \leq m-1$) may include means for affixing an n-th level terminal ID code identifying each n-th level service providing terminal to the money bag number supplied from the corresponding (n−1)-th level service providing terminal located in an (n−1)-th level in hierarchy, and for supplying the money bag number having the n-th level terminal ID code affixed thereto to the corresponding (n+1)-th service providing terminal (s) located in an (n+1)-level in hierarchy as an n-th level terminal money bag number assigned to each n-th level service providing terminal, together with the collecting terminal ID code;

each of m-th level service providing terminals located in an m-th level in hierarchy may include request information sending means for affixing an m-th level terminal ID code identifying each m-th level service providing terminal to the money bag number supplied from the corresponding (m−1)-th level service providing terminal located in an (m−1)-th level in hierarchy, thereby generating an m-th level terminal money bag number assigned to each m-th level service providing terminal, and for supplying request information which includes the collecting terminal ID code and the generated money bag number to one of the user terminals in response to a dealing request therefrom;

each n-th level service providing terminal may further include means for collecting from the corresponding (n+1)-th level service providing terminals) the electronic tickets with digital signatures including the n-th level terminal money bag number after the m-th level service providing terminals have performed deals with the user terminals, and for sending the collected electronic tickets to the corresponding (n−1)th level service providing terminal; and the first level service providing terminal may further include means for collecting from the second level service providing terminals the electronic tickets with digital signatures including the money bag number which the first level service providing terminal has sent to the second level service providing terminals, and for sending the collected electronic tickets to the at least one collecting terminal which is identified by the collecting terminal ID code contained in the digital signatures affixed to the collected electronic tickets.

The at least one collecting terminal may include a plurality of collecting terminals which are hierarchically arranged in first to m-th levels (m is a natural number);

of the plurality of collecting terminals, the first level collecting terminal located in the first level in hierarchy includes means for supplying, to the second level collecting terminals located in the second level in hierarchy, a collecting terminal ID code identifying the first level collecting terminal and a collection money bag number which serves as collection ID information;

each of n-th level collecting terminals located in an n-th level in hierarchy (n is a natural number given as 2≦n≦m−1) may include means for affixing an n-th level terminal ID code identifying each n-th level collecting terminal to the collection money bag number supplied from the corresponding (n−1)-th level collecting terminal located in an (n−1)-th level in hierarchy, and for sending the collection money bag number having the n-th level terminal ID code affixed thereto to the corresponding (n+1)-th collecting terminal(s) located in an (n+1)-level in hierarchy as an n-th level terminal collection money bag number assigned to each n-th level collecting terminal, together with the collecting terminal ID code; each of m-th level collecting terminals located in an m-th level in hierarchy may include means for affixing an m-th level terminal ID code identifying each m-th level collecting terminal to the collection money bag number supplied from the corresponding (m−1)-th level collecting terminal located in an (m−1)-th level in hierarchy, and for storing as the money bag number the collection money bag number having the m-th level terminal ID code affixed thereto, and for supplying the collecting terminal ID code to the service providing terminal;

each n-th level collecting terminal may further include means for collecting from the corresponding (n+1)-th collecting terminal(s) the electronic tickets with digital signatures including the n-th level terminal collection money bag number after the m-th level collecting terminals have received the electronic tickets from the service providing terminal, and for sending the collected electronic tickets to the corresponding (n−1)-th level collecting terminal; and the first level collecting terminal may collect from the second level collecting terminals the electronic tickets with digital signatures including the collection money bag number which the first level collecting terminal has sent to the second level collecting terminals.

The request information sending means of the at least one service providing terminal may further include means for generating the request information by applying one-way hash functions to information which contains the collecting terminal ID code and the money bag number.

With the above structures, the amount of request information can be suppressed to a predetermined amount, while the contents of information contained in the request information is prevented from being known to a third party including users.

According to the fourth aspect of the present invention, there is provided an electronic ticket system comprising:

user terminals which store electronic tickets; and at least one collecting terminal for collecting the electronic tickets;

wherein the at least one user terminal includes signature generating means for generating a digital signature which contains a money bag number serving as collection ID information and including time information, and sending means for affixing the signature generated by the signature generating means to an electronic ticket to be used for a deal and for sending the electronic ticket with the generated signature to the at least one collecting terminal, and the at least one collecting terminal includes storage means for storing electronic tickets which the at least one collecting terminal has received within a predetermined period, money bag number checking means for checking whether the time information, included in money bag numbers contained in digital signatures affixed to the electronic tickets sent from the user terminals, specifies time within the predetermined period, and double use checking means for checking whether the electronic tickets sent from the user terminals include no electronic tickets identical with the electronic tickets stored in the storage means.

According to the fifth aspect of the present invention, there is provided an electronic ticket system comprising:

user terminals which store electronic tickets;

at least one service providing terminal for performing deals with the user terminals; and at least one collecting terminal for collecting the electronic tickets after used for the deals;

wherein the at least one service providing terminal includes request information sending means for sending request information, containing a collecting terminal ID code which identifies the at least one collecting terminal, to the user terminals in response to dealing requests therefrom, each of the user terminals includes signature generating means for generating a digital signature containing the request information sent from the at least one service providing terminal, and ticket sending means for affixing the signature generated by the signature generating means to an electronic ticket to be used for a deal and for sending the electronic ticket with the generated signature to the at least one service providing terminal, and the at least one service providing terminal includes used ticket sending means for sending the electronic tickets received from the used terminals to the at least one collecting terminal which is identified by the collecting terminal ID code contained in digital signatures affixed to the electronic tickets.

The at least one collecting terminal may include ticket checking means for checking whether the electronic tickets received from the user terminals include no electronic tickets identical with electronic tickets which the at least one collecting terminal has collected before.

In the electronic ticket system according to the second, third, fourth or fifth aspect of the present invention, each user terminal may include an IC card which stores at least one of an electronic ticket and a private key for use in generating a digital signature, and means for sending the electronic ticket through utilization of information stored in the IC card.

The electronic ticket system may further comprise an issuing terminal for issuing electronic tickets, the at least one collecting terminal may include returning means for returning collected electronic tickets to the issuing terminal, and the issuing terminal may include issuing storage means for storing information pertaining to the issued electronic tickets, and ticket discriminating means for discriminating whether the electronic tickets returned from the returning means are proper.

According to the above structures, the issuing terminal which have issued the electronic tickets determines whether the electronic tickets as collected by the collecting terminal are proper, by reference to the information concerning the electronic tickets. By so doing, the double use of the electronic tickets issued by the issuing terminal, etc. can be detected.

The electronic tickets may have a monetary value.

According to the sixth aspect of the present invention, there is provided a collecting terminal for collecting used electronic tickets in an electronic ticket system which comprises:

user terminals which store electronic tickets; and at least one service providing terminal for performing deals with the user terminals by using the electronic tickets;

wherein the collecting terminal includes supplying means for supplying a collecting terminal ID code which identifies the collecting terminal and a money bag number which serves as collection ID information to the at least one service providing terminal, storage management means for storing and managing the collecting terminal ID code supplied to the at least one service providing terminal, collecting means for collecting the electronic tickets after used for the deals from the at least one service providing terminal, money bag checking means for checking, by reference to information stored in the storage management means, whether money bag numbers contained in digital signatures affixed to the electronic tickets collected by the collecting means are identical with the money bag number supplied to the at least one service providing terminal and have not been used before, and ticket checking means for checking whether the electronic tickets collected by the collecting means include no identical electronic tickets.

According to the seventh aspect of the present invention, there is provided a collecting terminal for collecting used electronic tickets in an electronic ticket system which comprises:

user terminals which store electronic tickets; and at least one service providing terminal for performing deals with the user terminals by using the electronic tickets;

wherein the collecting terminal includes supplying means for supplying a collecting terminal ID code which identifies the collecting terminal to the at least one service providing terminal, generating means for generating, in accordance with a predetermined rule, a money bag number which serves as collection ID information, storage management means for storing and managing the money bag number generated by the generating means, collecting means for collecting the electronic tickets after used for the deals from the at least one service providing terminal, money bag number checking means for checking, by reference to information stored in the storage management means, whether money bag numbers contained in digital signatures affixed to the electronic tickets collected by the collecting means are identical with the money bag number generated by the generating means and have not been used before, and ticket checking means for checking whether the electronic tickets collected by the collecting means include no identical electronic tickets.

With the above structures, among the electronic tickets collected from the service providing terminal, any copy of one electronic ticket or any copy of an electric ticket collected before can be detected.

According to the eighth aspect of the present invention, there is provided a collecting terminal for collecting used electronic tickets in an electronic ticket system which comprises:

user terminals which store electronic tickets; and at least one service providing terminal for performing deals with the user terminals by using the electronic tickets;

wherein the collecting terminal includes collecting means for collecting the electronic tickets after used for the deals from the at least one service providing terminal, and ticket checking means for checking whether the electronic tickets collected by the collecting means include no identical electronic tickets.

In the above-described collecting terminal, the electronic tickets may have a monetary value.

According to the ninth aspect of the present invention, there is provided a service providing terminal for performing deals with user terminals by using electronic tickets in an electronic ticket system which comprises:

the user terminals which store the electronic tickets; and at least one collecting terminal for collecting the electronic tickets after used for the deals;

wherein the at least one service providing terminal includes request information sending means for sending request information, containing a collecting terminal ID code which identifies the at least one collecting terminal and a money bag number which serves as collection ID information, to the user terminals in response to dealing requests therefrom, ticket receiving means for receiving electronic tickets having digital signatures assigned thereto from the user terminals, the digital signatures containing the request information sent from the request information sending means, and used ticket sending means for collecting, of the electronic tickets received from the user terminals, electronic tickets with digital signatures containing identical money bag numbers, and for sending the collected electronic tickets to the at least one collecting terminal which is identified by the collecting terminal ID code contained in the digital signatures affixed to the collected electronic tickets.

The service providing terminal may further include inhibiting control means for inhibiting the use of the money bag numbers contained in the electronic tickets after the used ticket sending means has sent the electronic tickets to the at least one collecting terminal.

The service providing terminal may further include receiving means for receiving from the at least one collecting terminal the collecting terminal ID code identifying the at least one collecting terminal.

According to the tenth aspect of the present invention, there is provided a service providing terminal for performing deals with user terminals by using electronic tickets in an electronic ticket system which comprises:

the user terminals which store the electronic tickets; and at least one collecting terminal for collecting the electronic tickets after used for the deals;

wherein the at least one service providing terminal includes receiving means for receiving from the at least one collecting terminal a collecting terminal ID code which identifies the at least one collecting terminal, generating means for generating a money bag number serving as collection ID information, in accordance with a rule identical with a generation rule employed in the at least one collecting terminal, request information sending means for sending request information to the user terminals in response to dealing requests therefrom, the request information containing the collecting terminal ID code received from the at least one collecting terminal and the money bag number generated by the generating means, ticket receiving means for receiving electronic tickets having digital signatures assigned thereto from the user terminals, the digital signatures containing the request information sent from the request information sending means, and used ticket sending means for collecting, of the electronic tickets received from the user terminals, electronic tickets with digital signatures containing identical money bag numbers, and for sending the collected electronic tickets to the at least one collecting terminal which is identified by the collecting terminal ID code contained in the digital signatures affixed to the collected electronic tickets.

According to the above-described structures, information concerning the collecting terminal, by which an electronic ticket after used is to be collected, and the to-be-collected group (the money bag number) to which the electronic money belongs, etc., is supplied to the user terminal. The electronic ticket, paid by the user terminal, is collected in accordance with the information contained in the electronic ticket. Thus, the information concerning the route by which the electronic ticket after used is to be collected is contained in the electronic ticket. Therefore, even if the electronic ticket should be collected by any illegal route, the illegality can be easily detected.

According to the eleventh aspect of the present invention, there is provided a service providing terminal for performing deals with user terminals by using electronic tickets in an electronic ticket system which comprises:

the user terminals which store the electronic tickets; and at least one collecting terminal for collecting the electronic tickets after used for the deals;

wherein the at least one service providing terminal includes receiving means for receiving from the at least one collecting terminal a collecting terminal ID code which identifies the at least one collecting terminal, request information sending means for sending request information to the user terminals in response to dealing requests therefrom, the request information containing the collecting terminal ID code received from the at least one collecting terminal, ticket receiving means for receiving electronic tickets having digital signatures assigned thereto from the user terminals, the digital signatures containing the request information sent from the request information sending means, and used ticket sending means for sending the electronic tickets received from the user terminals to the at least one collecting terminal which is identified by the collecting terminal ID code contained in the digital signatures affixed to the received electronic tickets.

In the above-described service providing terminal, the electronic tickets have a monetary value.

According to the twelfth aspect of the present invention, there is provided a user terminal for performing a deal with at least one service providing terminal in an electronic ticket system which comprises:

the at least one service providing terminal for performing the deal with the user terminal by using an electronic ticket; and at least one collecting terminal for collecting the electronic ticket after used for the deal;

wherein the user terminal includes request information receiving means for requesting and receiving request information, containing a collecting terminal ID code and a money bag number, from the at least one service providing terminal before the deal, the collecting terminal ID code identifying the at least one collecting terminal by which the electronic ticket after used for the deal is to be collected, and the money bag number serving as collection ID information, signature generating means for generating a digital signature containing the request information received by the request information receiving means, and ticket sending means for affixing the signature generated by the signature generating means to the electronic ticket to be used for the deal, and for sending the electronic ticket with the generated signature to the at least one service providing terminal.

According to the above-described structures, the information concerning the collecting terminal, by which an electronic ticket after used is to be collected, and the to-be-collected group (the money bag number) to which the electronic money belongs, etc., is contained in the electronic ticket. Thus, the information concerning the route by which the electronic ticket after used is to be collected is contained in the electronic ticket. Therefore, even if the electronic ticket should be collected by any illegal route, the illegality can be easily detected.

According to the thirteenth aspect of the present invention, there is provided a user terminal for performing a deal with at least one service providing terminal in an electronic ticket system which comprises:

the at least one service providing terminal for performing the deal with the user terminal by using an electronic ticket; and at least one collecting terminal for collecting the electronic ticket after used for the deal;

wherein the user terminal includes request information receiving means for requesting and receiving request information containing a collecting terminal ID code from the at least one service providing terminal before the deal, the collecting terminal ID code identifying the at least one collecting terminal by which the electronic ticket after used for the deal is to be collected, signature generating means for generating a digital signature containing the request information received by the request information receiving means, and ticket sending means for affixing the signature generated by the signature generating means to the electronic ticket to be used for the deal, and for sending the electronic ticket with the generated signature to the at least one service providing terminal.

The above-described user terminal may further include:

an IC card which stores at least one of the electronic ticket and a private key for use in generating the digital signature; and means for sending the electronic ticket through utilization of information stored in the IC card.

According to the fourteenth aspect of the present invention, there is provided an electronic ticket collecting method for collecting electronic tickets used in an electronic ticket system, the method comprising:

a request information sending step of sending, from at least one service providing agency to users, request information containing a money bag number which serves as collection ID information and a collecting agency ID code which identifies at least one collecting agency, in response to dealing requests from the users;

a ticket sending step of receiving the request information sent by the request information sending step, generating digital signatures containing the request information, affixing the generated signatures to the electronic tickets to be used for deals, and sending the electronic tickets with the generated signatures to the at least one service providing agency; and a ticket collecting step of collecting, of the electronic tickets sent by the ticket sending step, electronic tickets with digital signatures containing identical money bag numbers, and sending the collected electronic tickets to the at least one collecting agency which is identified by the collecting agency ID code contained in the digital signatures affixed to the collected electronic tickets.

According to the above-described structure, the information concerning the collecting agency, by which an electronic ticket after used is to be collected, and the to-be-collected group (the money bag member) to which the electronic money belongs, etc., is affixed to the electronic ticket to be used for a deal. The electronic ticket after used is collected in accordance with the information affixed thereto. Even if the electronic ticket should be collected by any illegal route, the illegality can be easily detected by reference to the information affixed to the electronic ticket.

The above-described electronic ticket collecting method may further comprise:

a supplying step of supplying the collecting agency ID code and the money bag number to the at least one service providing agency before the request information sending step;

a checking step of checking whether the money bag numbers, contained in the digital signatures affixed to the electronic tickets sent to the at least one collecting agency, are identical with the money bag number supplied by the supplying step and have not been used before, and checking whether the electronic tickets sent to the at least one collecting agency include no identical electronic tickets.

The at least one service providing agency described above may include a plurality of service providing terminals which are hierarchically arranged in first to m-th levels (m is a natural number);

the sending step may include steps of supplying the collecting agency ID code and the money bag number, from a first level service providing terminal located in the first level in hierarchy to second level service providing terminals located in the second level in hierarchy among the plurality of service providing terminals, in each of n-th level service providing terminals located in an n-th level in hierarchy (n is a natural number given as $2 \leq n \leq m-1$), affixing an n-th level terminal ID code identifying each n-th level service providing terminal to the money bag number supplied from the corresponding (n−1)-th level service providing terminal located in an (n−1)-th level in hierarchy, and supplying the money bag number having the n-th level terminal ID code affixed thereto to the corresponding (n+1)-th service providing terminal(s) located in an (n+1)-level in hierarchy as an n-th level terminal money bag number assigned to each n-th level service providing terminal, together with the collecting agency ID code, and in each of m-th level service providing terminals located in an m-th level in hierarchy, affixing an m-th level terminal ID code identifying each m-th level service providing terminal to the money bag number supplied from the corresponding (m−1)-th level service providing terminal located in an (m−1)-th level in hierarchy, thereby generating an m-th level terminal money bag number assigned to each m-th level service providing terminal, and sending request information which includes the collecting agency ID code and the generated money bag number to one of the users in response to a dealing request therefrom; and the ticket collecting step may include steps of in each n-th level service providing terminal, collecting from the corresponding (n+1)-th level service providing terminal(s) the electronic tickets with digital signatures including the n-th level terminal money bag number after the m-th level service providing terminals have performed deals with the users, and supplying the collected electronic tickets to the corresponding (n−1)-th level service providing terminal, and in the first level service providing terminal, collecting from the second level service providing terminals the electronic tickets with digital signatures including the money bag number which the first level service providing terminal has sent to the second level service providing terminals, and sending the collected electronic tickets to the at least one collecting agency which is identified by the collecting agency ID code contained in the digital signatures affixed to the collected electronic tickets.

The at least one collecting agency may include a plurality of collecting terminals which are hierarchically arranged in first to m-th levels (m is a natural number);

the supplying step may include steps of supplying, from a first level collecting terminal located in the first level in hierarchy to second level collecting terminals located in the second level in hierarchy among the plurality of collecting terminals, a collecting terminal ID code which identifies the first level collecting terminal and a collection money bag number which serves as collection ID information, in each of n-th level collecting terminals located in an n-th level in hierarchy (n is a natural number given as $2 \leq n \leq m-1$), affixing an n-th level terminal ID code identifying each n-th level collecting terminal to the collection money bag number supplied from the corresponding (n−1)-th level collecting terminal located in an (n−1)-th level in hierarchy, and supplying the collection money bag number having the n-th level terminal ID code affixed thereto to the corresponding (n+1)-th collecting terminal(s) located in an (n+1)-level in hierarchy as an n-th level terminal collection money bag number assigned to each n-th level collecting terminal, together with the collecting terminal ID code, and in each of m-th level collecting terminals located in an m-th level in hierarchy, affixing an m-th level terminal ID code identifying each m-th level collecting terminal to the collection money bag number supplied from the corresponding (m−1)-th level collecting terminal located in an (m−1)-th level in hierarchy, and supplying the collection money bag number having the m-th level ID code affixed thereto to the at least one service providing agency as the money bag number, together with the collecting terminal ID code; and the electronic ticket collecting method may further comprise steps of in each n-th level collecting terminal, collecting the electronic tickets with digital signatures including the n-th level terminal collection money bag number from the corresponding (n+1)-th collecting terminal(s) after the m-th level collecting terminals have received the electronic tickets collected by the ticket collecting step, and sending the collected electronic tickets to the corresponding (n−1)-th level collecting terminal, and in the first level collecting terminal, collecting from the second level collecting terminals the electronic tickets with digital signatures including the collection money bag number which the first level collecting terminal has sent to the second level collecting terminals.

According to the fifteenth aspect of the present invention, there is provided an electronic ticket collecting method for collecting electronic tickets after used for deals in a system which performs the deals by using the electronic tickets, the method comprising:

a supplying step of supplying a collecting agency ID code identifying at least one collecting agency to at least one service providing agency for performing deals;

a generating step of generating a money bag number which serves as collection ID information in accordance with a predetermined rule;

a sending step of generating a money bag number in the at least one service providing agency in accordance with a rule identical with the predetermined rule employed in the generating step, and sending request information, which contains the generated money bag number and the collecting agency ID code supplied by the supplying step, to users in response to dealing requests therefrom;

a ticket sending step of receiving the request information sent by the sending step, generating digital signatures containing the request information, affixing the generated signatures to the electronic tickets to be used for deals, and sending the electronic tickets with the generated signatures to the at least one service providing agency; and a ticket collecting step of collecting, of the electronic tickets sent by the ticket sending step, electronic tickets with digital signatures containing identical money bag numbers, and sending the collected electronic tickets to the at least one collecting agency which is identified by the collecting agency ID code contained in the digital signatures affixed to the collected electronic tickets.

The above-described electronic ticket collecting method may further comprise:

a checking step of checking, in the at least one collecting agency, whether the money bag numbers contained in the digital signatures affixed to the electronic tickets collected from the at least one service providing agency are identical with the money bag number generated by the generating step and have not been used before, and whether the collected electronic tickets include no identical electronic tickets.

The at least one service providing agency may include a plurality of service providing terminals which are hierarchically arranged in first to m-th levels (m is a natural number);

the sending step may include steps of supplying, from a first level service providing terminal located in the first level in hierarchy to second level service providing terminals located in the second level in hierarchy among the plurality of service providing terminals, the money bag number generated by the generating step and the collecting agency ID code supplied from the at least one collecting agency, in each of n-th level service providing terminals located in an n-th level in hierarchy (n is a natural number given as $2 \leq n \leq m-1$), affixing an n-th level terminal ID code identifying each n-th level service providing terminal to the money bag number supplied from the corresponding (n−1)-th level service providing terminal located in an (n−1)-th level in hierarchy, and supplying the money bag number having the n-th level terminal ID code affixed thereto to the corresponding (n+1)-th service providing terminal(s) located in an (n+1)-level in hierarchy as an n-th level terminal money bag number assigned to each n-th level service providing terminal, together with the collecting agency ID code, and in each of m-th level service providing terminals located in an m-th level in hierarchy, affixing an m-th level terminal ID code identifying each m-th level service providing terminal to the money bag number supplied from the corresponding (m−1)-th level service providing terminal located in an (m−1)-th level in hierarchy, thereby generating an m-th level terminal money bag number assigned to each m-th level service providing terminal, and supplying request information which includes the collecting agency ID code and the generated money bag number to one of users in response to a dealing request therefrom; and the ticket collecting step may include steps of in each n-th level service providing terminal, collecting from the corresponding (n+1)-th level service providing terminal(s) the electronic tickets with digital signatures including the n-th level terminal money bag number after the m-th level service providing terminals have performed deals with the users, and sending the collected electronic tickets to the corresponding (n−1)-th level service providing terminal, and in the first level service providing terminal, collecting from the second level service providing terminals the electronic tickets with digital signatures including the money bag number which the first level service providing terminal has sent to the second level service providing terminals, and sending the collected electronic tickets to the at least one collecting agency which is identified by the collecting agency ID code contained in the digital signatures affixed to the collected electronic tickets.

The at least one collecting agency may include a plurality of collecting terminals which are hierarchically arranged in first to m-th levels (m is a natural number);

the supplying step may include steps of supplying, from a first level collecting terminal located in the first level in hierarchy to second level collecting terminals located in the second level in hierarchy among the plurality of collecting terminals, a collecting terminal ID code which identifies the first level collecting terminal and a collection money bag number which serves as collection ID information, in each of n-th level collecting terminals located in an n-th level in hierarchy (n is a natural number given as $2 \leq n \leq m-1$), affixing an n-th level terminal ID code identifying each n-th level collecting terminal to the collection money bag number supplied from the corresponding (n−1)-th level collecting terminal located in an (n−1)-th level in hierarchy, and supplying the collection money bag number having the n-th level terminal ID code affixed thereto to the corresponding (n+1)-th collecting terminal(s) located in an (n+1)-level in hierarchy as an n-th level terminal collection money bag number assigned to each n-th level collecting terminal, together with the collecting terminal ID code, and in each of m-th level collecting terminals located in an m-th level in hierarchy, affixing an m-th level terminal ID code identifying each m-th level collecting terminal to the collection money bag number supplied from the corresponding (m−1)-th level collecting terminal located in an (m−1)-th level in hierarchy, and storing as the money bag number the collection money bag number having the m-th level ID code affixed thereto, and supplying the collecting terminal ID code to the at least one service providing agency; and the electronic ticket collecting method may further comprise steps of in each n-th level collecting terminal, collecting the electronic tickets with digital signatures including the n-th level terminal collection money bag number from the corresponding (n+1)-th collecting terminal (s) after the m-th level collecting terminals have received the electronic tickets collected by the ticket collecting step, and sending the collected electronic tickets to the corresponding (n−1)-th level collecting terminal, and in the first level collecting terminal, collecting from the second level collecting terminals the electronic tickets with digital signatures including the collection money bag number which the first level collecting terminal has sent to the second level collecting terminals.

According to the sixteenth aspect of the present invention, there is provided an electronic ticket collecting method for collecting used electronic tickets in a system, the method comprising:

a sending step of sending request information, which contains a collecting agency ID code identifying at least one collecting agency, to users in response to dealing requests therefrom;

a ticket sending step of receiving the request information sent by the sending step, generating digital signatures containing the request information, affixing the generated signatures to electronic tickets to be used, and sending the electronic tickets with the generated signatures to the at least one service providing agency; and a ticket collecting step of collecting, of the electronic tickets sent by the ticket sending step, electronic tickets with digital signatures containing identical money bag numbers, and sending the collected electronic tickets to the at least one collecting agency which is identified by the collecting agency ID code contained in the digital signatures affixed to the collected electronic tickets.

The above-described electronic ticket may further comprise:

a ticket checking step of checking, in the at least one collecting agency, whether the electronic tickets sent by the ticket sending step include no identical electronic tickets.

According to the seventeenth aspect of the present invention, there is provided a recording medium having programs recorded therein, the programs being readable by a computer and making the computer function as a collecting terminal in a system which comprises:

user terminals which store electronic tickets;

at least one service providing terminal for performing deals with the user terminals by using the electronic tickets; and the collecting terminal for collecting the electronic tickets after used for the deals;

wherein the programs makes the computer function as supplying means for supplying a collecting terminal ID code which identifies the collecting terminal and a money bag number which serves as collection ID information to the at least one service providing terminal, storage management means for storing and managing the money bag number supplied from the supplying means to the at least one service providing terminal, collecting means for collecting the electronic tickets after used for the deals from the at least one service providing terminal, money bag number checking means for checking, by reference to information stored in the storage management means, whether money bag numbers contained in digital signatures affixed to the electronic tickets collected by the collecting means are identical with the money bag number supplied to the at least one service providing terminal and have not been used before, and ticket checking means for checking whether the electronic tickets collected by the collecting means include no identical electronic tickets.

According to the eighteenth aspect of the present invention, there is provided a recording medium having programs recorded therein, the programs being readable by a computer and making the computer function as a collecting terminal in a system which comprises:

user terminal which store electronic tickets;

at least one service providing terminal for performing deals with the user terminals by using the electronic tickets; and the collecting terminal for collecting the electronic tickets after used for the deals;

wherein the programs makes the computer function as collecting means for collecting the electronic tickets after used for the deals from the at least one service providing terminal, money bag number checking means for checking whether money bag numbers, contained in digital signatures affixed to the electronic tickets collected by the collecting means, have not been used before, said money bag numbers serving as collection ID information, and ticket checking means for checking whether the electronic tickets collected by the collecting means include no identical electronic tickets.

According to the nineteenth aspect of the present invention, there is provided a recording medium having programs recorded therein, the programs being readable by a computer and making the computer function as a collecting terminal in a system which comprises:

user terminals which store electronic tickets;

at least one service providing terminal for performing deals with the user terminals by using the electronic tickets; and the collecting terminal for collecting the electronic tickets after used for the deals;

wherein the programs makes the computer function as storage management means for generating a money bag number which serves as collection ID information, and storing and managing the generated money bag number, collecting means for collecting the electronic tickets after used for the deals from the at least one service providing terminal, money bag number checking means for checking, by reference to information stored in the storage management means, whether money bag numbers contained in digital signatures affixed to the electronic tickets collected by the collecting means are identical with the money bag number generated by the storage management means and have not been used before, and ticket checking means for checking whether the electronic tickets collected by the collecting means include no identical electronic tickets.

According to the twentieth aspect of the present invention, there is provided a recording medium having programs recorded therein, the programs being readable by a computer and making the computer function as a service providing terminal in a system which comprises:

user terminals which store electronic tickets;

the service providing terminal for performing deals with the user terminals by using the electronic tickets; and at least one collecting terminal for collecting the electronic tickets after used for the deals;

wherein the programs makes the computer function as request information sending means for sending request information, which contains a collecting terminal ID code identifying the at least one collecting terminal and a money bag number serving as collection ID information, to the user terminals, ticket receiving means for receiving, from the user terminals, electronic tickets with digital signatures containing the request information sent from the request information sending means, and used ticket sending means for collecting, of the electronic tickets received from the user terminals, electronic tickets with digital signatures containing identical money bag numbers, and for sending the collected electronic tickets to the at least one collecting terminal which is identified by the collecting terminal ID code contained in the digital signatures affixed to the collected electronic tickets.

According to the twenty-first aspect of the present invention, there is provided a recording medium having programs recorded therein, the programs being readable by a computer and making the computer function as a service providing terminal in a system which comprises:

user terminals which store electronic tickets;

the service providing terminal for performing deals with the user terminals by using the electronic tickets; and at least one collecting terminal for collecting the electronic tickets after used for the deals;

wherein the programs makes the computer function as generating means for generating a money bag number which serves as collection ID information in accordance with a rule identical with a predetermined rule employed in the at least one collecting terminal, request information sending means for sending request information, which contains a collecting terminal ID number identifying the at least one collecting terminal and the money bag number generated by the generating means, to the user terminals in response to dealing requests therefrom, ticket receiving means for receiving, from the user terminals, electronic tickets with digital signatures containing the request information sent from the request information sending means, and used ticket collecting means for collecting, of the received electronic tickets, electronic tickets with digital signatures containing identical money bag numbers, and for sending the collected electronic tickets to the at least one collecting terminal which is identified by the collecting terminal ID code contained in the digital signatures affixed to the collected electronic tickets.

According to the twenty-second aspect of the present invention, there is provided a recording medium having programs recorded therein, the programs being readable by a computer and making the computer function as a user terminal in a system which comprises:

at least one service providing terminal for performing deals by using the electronic tickets; and at least one collecting terminal for collecting the electronic tickets after used for the deals;

wherein the programs makes the computer function as request information receiving means for requesting and receiving request information, which contains a collecting terminal ID code and money bag number serving as collection ID information, from the at least one service providing terminal before the deals, the collecting terminal ID code identfying the at least one collecting terminal by which the electronic tickets after used for the deals are to be collected, signature generating means for generating digital signatures contaming the request information received by the request information receiving means, and ticket sending means for affixing the signature generated by the signature generating means to the electronic tickets to be used for the deals, and for sending the electronic tickets with the generated signatures to the at least one service providing terminal.

The "deal" mentioned above is not limited to giving and receiving money and an article, and comprehends giving and receiving information.

The collecting terminal includes any computer installed in a financial agency or institution such as a bank, a post office, a credit union or the like.

DETAILED DESCRIPTION OF THE PREFERRED EMBODIMENT

Embodiments of the present invention will now be explained with reference to the accompanying drawings.

First Embodiment

Figure 1:
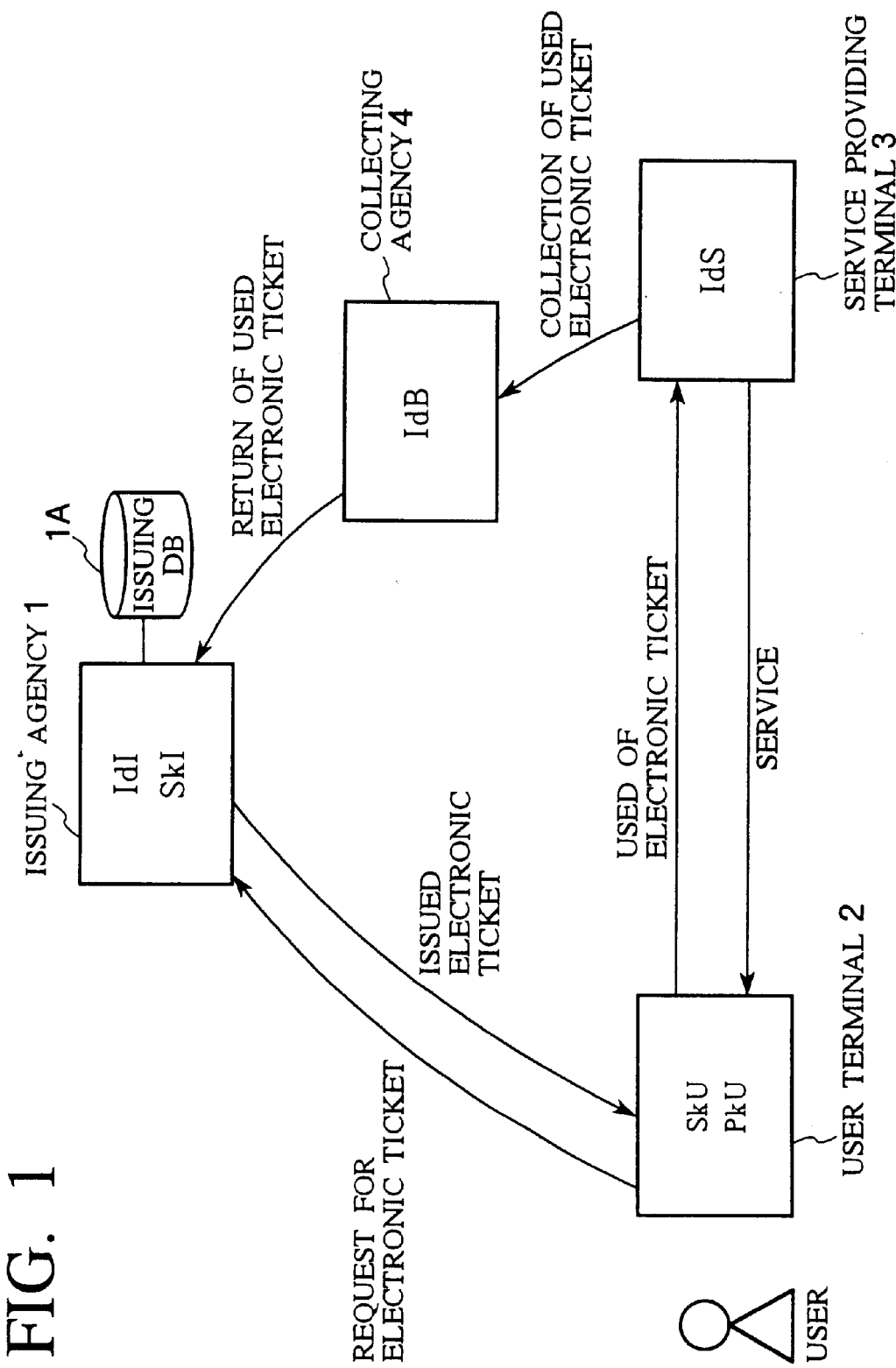
FIG. 1 is a diagram which schematically illustrates the structure of an electronic ticket system according to the first embodiment of the present invention.

The electronic ticket system according to the first embodiment of the present invention includes an issuing agency 1, a user terminal (terminals) 2 owned by a user, a service providing terminal (terminals) 3 and a collecting agency (agencies) 4, as illustrated in FIG. 1.

The issuing agency 1 has a computer and the like for issuing electronic tickets to be used for payment in the aforementioned system. At a request from the user terminal, for example, the issuing agency 1 issues an electronic ticket and stores, in its own issuing database (DB) 1A, issuing information concerning the issued electronic ticket (e.g. the issued amount, a ticket number for identifying the issued electronic ticket, the term of validity, etc.).

Further, by reference to the issuing DB 1A, the issuing agency 1 ascertains whether a used electronic ticket returned from the collecting agency 4 is one issued by the issuing agency 1. When the issuing agency 1 ascertains that the electronic ticket is authentic, the issuing agency 1 stores information concerning the used electronic ticket in the issuing DB 1A.

Moreover, the issuing agency 1 stores a ticket issuing agency name IdI for identifying the issuing agency 1 and a pair of keys, i.e., a private key SkI and a public key PkI.

The user terminal 2 receives an issued electronic ticket from the issuing agency 1 and uses it. The user terminal 2 includes, for example, a PDA (Personal Digital Assistant) and the like, and stores a pair of keys, i.e., a user private key SkU and a user public key PkU.

The service providing terminal 3 provides the user terminal 2 (user) with services, etc., and receives the electronic ticket corresponding to the charge for the services, etc. from the user terminal 2. Furthermore, the service providing terminal 3 stores a service provider name IdS (including an ID, account information, etc.) for identifying the service providing terminal 3.

The collecting agency 4 includes a computer and the like for collecting electronic tickets used for payment from the service providing terminal 3, and for returning those electronic tickets to the issuing agency 1. The collecting agency 4 generates numbers (hereinafter referred to as money bag numbers Gb) which differ depending on individual service providing terminals 3, stores the generated numbers and informs the service providing terminals 3 of the generated numbers. When collecting used electronic tickets, the money bag numbers Gb are affixed to those tickets as collection ID information. According to the electronic ticket system, the electronic tickets having the same money bag number Gb affixed thereto are collected together.

A method for generating the money bag numbers Gb, etc. is arbitrary. For example, the collecting agency 4 may assign natural numbers to the service providing terminals 3, counting up them one by one. The collecting agency 4 classifies the money bag numbers Gb into a group of numbers which have already be used (supplied) and a group of unused numbers, and stores and manages them. The money bag numbers which have already been used are not employed again. The collecting agency 4 generates the money bag numbers Gb at predetermined timings, and provides the individual service providing terminals 3 with the generated money bag numbers Gb.

Further, the collecting agency 4 stores a collecting agency name IdB for identifying the collecting agency 4.

The processes which are carried out by the electronic ticket system described above includes a series of main processes, i.e., the "ticket issuing process" for issuing an electronic ticket, the "ticket using process" for using the issued electronic ticket, the "ticket collecting process" for collecting the used electronic ticket, and the "ticket charge paying process" for paying the charge for the collected electronic ticket. Those processes will now be explained in sequence.

Figure 2:
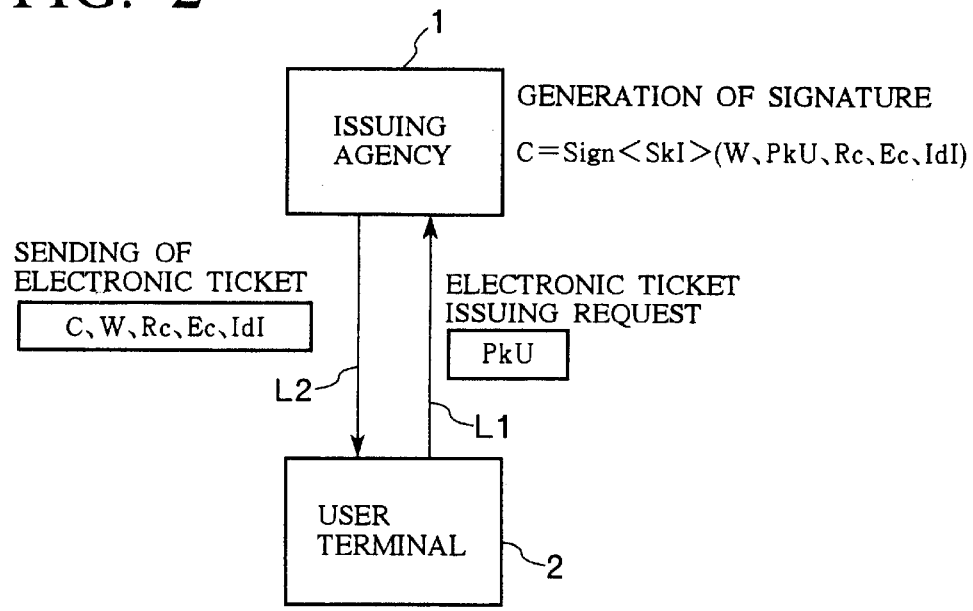
FIG. 2 is a diagram for explaining a ticket issuing process carried out by the electronic ticket system illustrated in FIG. 1.

(1) Ticket Issuing Process:

As illustrated in FIG. 2, the user terminal 2 sends an electronic ticket issuing request and its own public key PkU to the issuing agency 1 (L1).

In response, with the private key SkI of the issuing agency 1, the issuing agency 1 digitally signs issuing information which includes the public key PkU as received from the user, the ticket issuing agency name IdI of the issuing agency 1, the issued amount W, the ticket number Rc for identifying an issued electronic ticket and the term of validity Ec, and generates a digital signature C (=sign <SkI> (W, PkU, Rc, Ec, IdI)) which contains the signed issuing information.

Next, the issuing agency 1 issues an electronic ticket {C, W, Rc, Ec, IdI} which contains the generated signature C, and sends it to the requester or the user terminal 2 (L2).

The issuing agency 1 stores, in the issuing DB IA, the issuing information concerning the electronic ticket as issued.

For example, the user terminal 2 receives the electronic ticket from the issuing agency 1 and stores it. Simultaneously, the user terminal 2 checks and verifies the signature C contained in the electronic ticket through utilization of the public key PkI of the issuing agency 1 which the user terminal 2 has acquired beforehand.

The electronic ticket issued by the issuing agency 1 is thus supplied to the user terminal 2.

The service providing terminal 3, the collecting agency 4 and the user terminal 2 have the public key PkI of the issuing agency 1. A method for acquiring the public key PkI of the issuing agency 1 is arbitrary. The public key PkI may be acquired by accessing, for example, a public key server which stores the public key PkI.

Alternatively, the issuing agency 1 may send the public key PkI to the user terminal 2 upon request.

Figure 3:
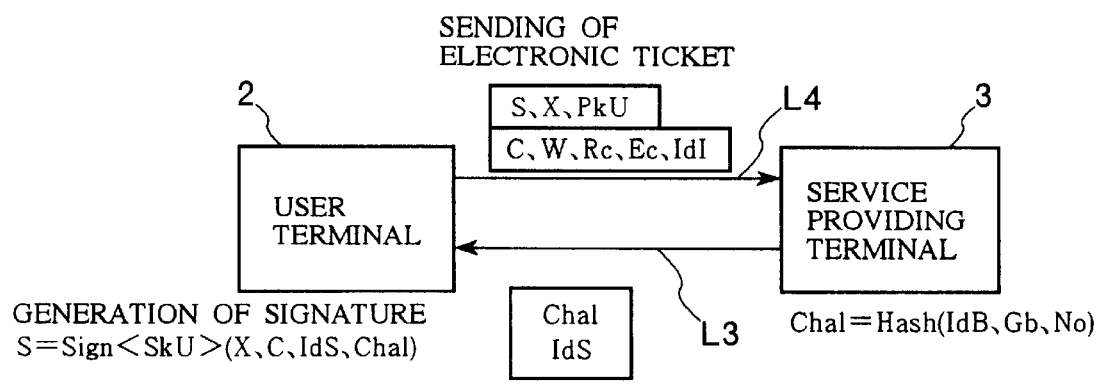
FIG. 3 is a diagram for explaining a ticket using process carried out by the electronic ticket system illustrated in FIG. 1.

(2) Ticket Using Process:

As illustrated in FIG. 3, the user terminal 2 acquires challenge information Chal and the service provider name IdS from the service providing terminal 3 before the use of the electronic ticket (L3). In the challenge information Chal, information which contains the collecting agency name IdB and the money bag number Gb1, which the collecting agency 4 has supplied in advance to the service providing terminal 3, and the management number No generated by the service providing terminal 3, is hashed using one-way hash functions or the like. By virtue of the use of the one-way hash functions, the user terminal 2 which has received the challenge information Chal cannot see the contents thereof (the collecting agency name IdB, the money bag number Gb and the management number No).

The user terminal 2 stores the challenge information Chal and the service provider name IdS received from the service providing terminal 3. With the private key SkU of the user terminal 2, the user terminal 2 digitally signs predetermined information which contains the signature C included in the electronic ticket of the user terminal 2, the challenge information Chal and the service provider name IdS as received, and the ticket's monetary amount X, and generates a signature S (=Sign <SkU> (X, C, IdS, Chal)). This signature S contains, as the signed information, the monetary amount X, the signature C, the service provider name IdS and the challenge information Chal. Then, the user terminal 2 sends the generated signature S, its own public key PkU, the monetary amount X and the electronic ticket {C, W, Rc, Ec, IdI} to the service providing terminal 3 (L4).

The service providing terminal 3 receives and stores the signature S, the user public key PkU, the monetary amount X and the electronic ticket {C, W, Rc, Ec, IdI}. The service providing terminal 3 checks and verifies the signature C by using the public key PkI of the issuing agency 1, and checks and verifies the signature S by using of the user public key PkU. After the verification of the signatures C and S, the service providing terminal 3 provides the user terminal 2 with, for example, services or the like.

The user terminal 2 uses the electronic ticket in the above-described manner.

In order to generate the same signature as the signature S affixed to the used electronic ticket, the user private key SkU is required. Therefore, it is impossible for the service providing terminal 3, for example, to forge such a used electronic ticket and handle the forged electronic ticket as if it were a used electronic ticket received from the user terminal 2.

Furthermore, the signature S contains the service provider name IdS for identifying the service providing terminal 3 which has actually performed a deal with the user terminal 2. Accordingly, it is also impossible for the service providing terminal 3 to steal a used electronic ticket dealt by another service providing terminal 3 and pretend to have actually dealt that ticket.

Figure 4:
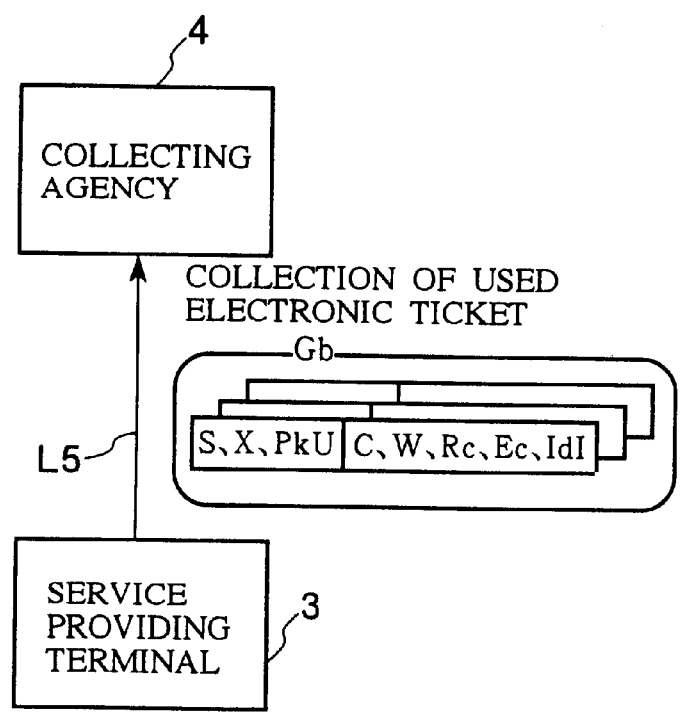
FIG. 4 is a diagram for explaining a ticket collecting process carried out by the electronic ticket system illustrated in FIG. 1.

(3) Ticket Collecting Process:

As illustrated in FIG. 4, the service providing terminal 3 groups together the used electronic tickets having the identical money bag numbers Gb, in other words, the used electronic tickets whose signatures S contain challenge information Chal including the identical money bag numbers Gb, and sends the used electronic tickets thus grouped together to the collecting agency 4 (L5).

The group of the electronic tickets thus formed can be expressed as "a money bag enclosing the used electronic tickets to which the signatures S, containing the identical money bag numbers Gb, have been affixed", for example.

In response, the collecting agency 4 ascertains whether the money bag numbers Gb, contained in the used electronic tickets as received, are proper. More specifically, the collecting agency 4 ascertains whether the money bag numbers Gb are identical with each other and whether the money bag numbers are ones supplied to the service providing terminal 3 and which have not yet been returned to the issuing agency 1, etc. For example, in the case where the money bag numbers Gb have already been returned to the issuing agency 1 or in the case where the money bag numbers Gb are not ones supplied to the service providing terminal 3, the collecting agency 4 determines that those money bag numbers are improper.

The collecting agency 4 further ascertains whether there are no identical electronic tickets in the received group of used electronic tickets. In other words, the collecting agency 4 ascertains whether the used electronic tickets include no electronic tickets created by copying or the like.

Moreover, the collecting agency 4 checks and verifies the signatures S and C of the used electronic tickets as received.

For example, by sorting the used electronic tickets, the collecting agency 4 can easily ascertain that there are no identical electronic tickets in the group as received.

Thus, without inquiring the issuing agency 1 or the like, the collecting agency 4 can ascertain in an offline state whether the used electronic tickets collected from the service providing terminal 3 are not copies of the used electronic tickets which had been collected before and whether there are no identical electronic tickets created by copying in the group of the used electronic tickets received this time from the service providing terminal 3. Accordingly, a process for paying the charges for the used electronic tickets as collected, for example, can be performed speedily.

Furthermore, by the above-described ascertaining procedures carried out by the collecting agency 4, the illegal actions such as copying the used electronic tickets on the part of the service providing terminal 3 can be prevented without the need to employ highly tamperproof specific hardware.

Since the signature S generated by the user terminal 2 contains the collecting agency name IdB which identifies the collecting agency 4, it is impossible for another collecting agency 4 to illegally obtain (by way of copying or the like) the used electronic tickets and handle them as ones collected properly.

Figure 5:
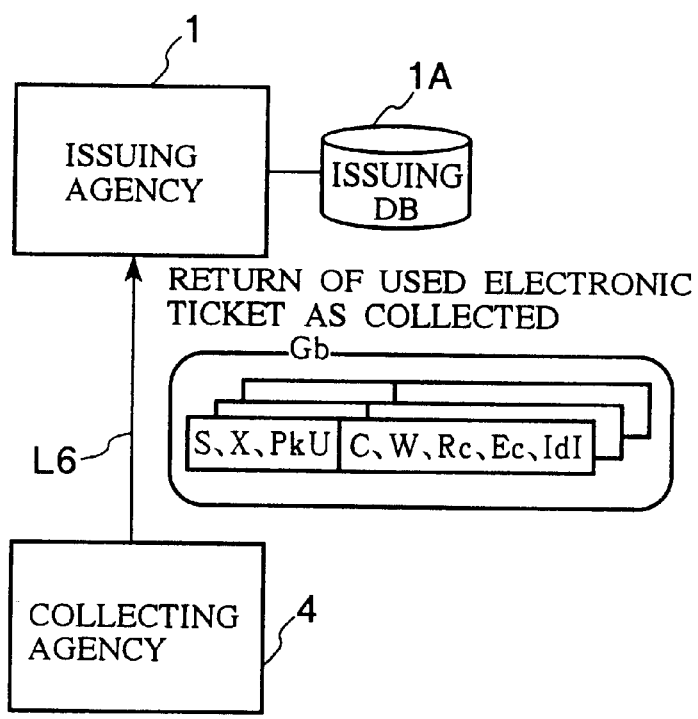
FIG. 5 is a diagram for explaining a ticket charge paying process carried out by the electronic ticket system illustrated in FIG. 1.

(4) Ticket Charge Paying Process:

As illustrated in FIG. 5, the collecting agency 4 returns the used electronic tickets as collected to the issuing agency 1 (L6).

By reference to the issuing DB 1A, the issuing agency 1 checks matters such as whether the used electronic tickets as received are those issued by the issuing agency 1 and include no identical electronic tickets (the checking of the presence/absence of double use). In checking the presence/absence of double use, the issuing agency 1 checks, for example, whether the monetary sum of the used electronic tickets as collected together exceeds the issued amount, etc. When the monetary sum of the used electronic tickets exceeds the issued amount, the issuing agency 1 determines that the used electronic tickets include the identical electronic tickets, that is, copies of one electronic ticket.

In this case, when the identical electronic tickets have different signatures S, the issuing agency 1 determines that any user (terminal 2) has done the copying action. When the identical electronic tickets have the same signature S, the issuing agency 1 determines that the collecting agency 4 has done the copying action, from the fact that the service providing terminal 3 cannot do such an action for the reason set forth previously.

Second Embodiment

Explanations will now be made to the second embodiment which employs, in place of the service providing terminal 3 explained in the first embodiment, a service providing agency 5 which has such a hierarchical structure that it includes a plurality of POS terminals installed in branch offices, branch office control terminals for controlling the POS terminals installed in the branch offices, and a main office control terminal for controlling the branch office control terminals.

Figure 6:
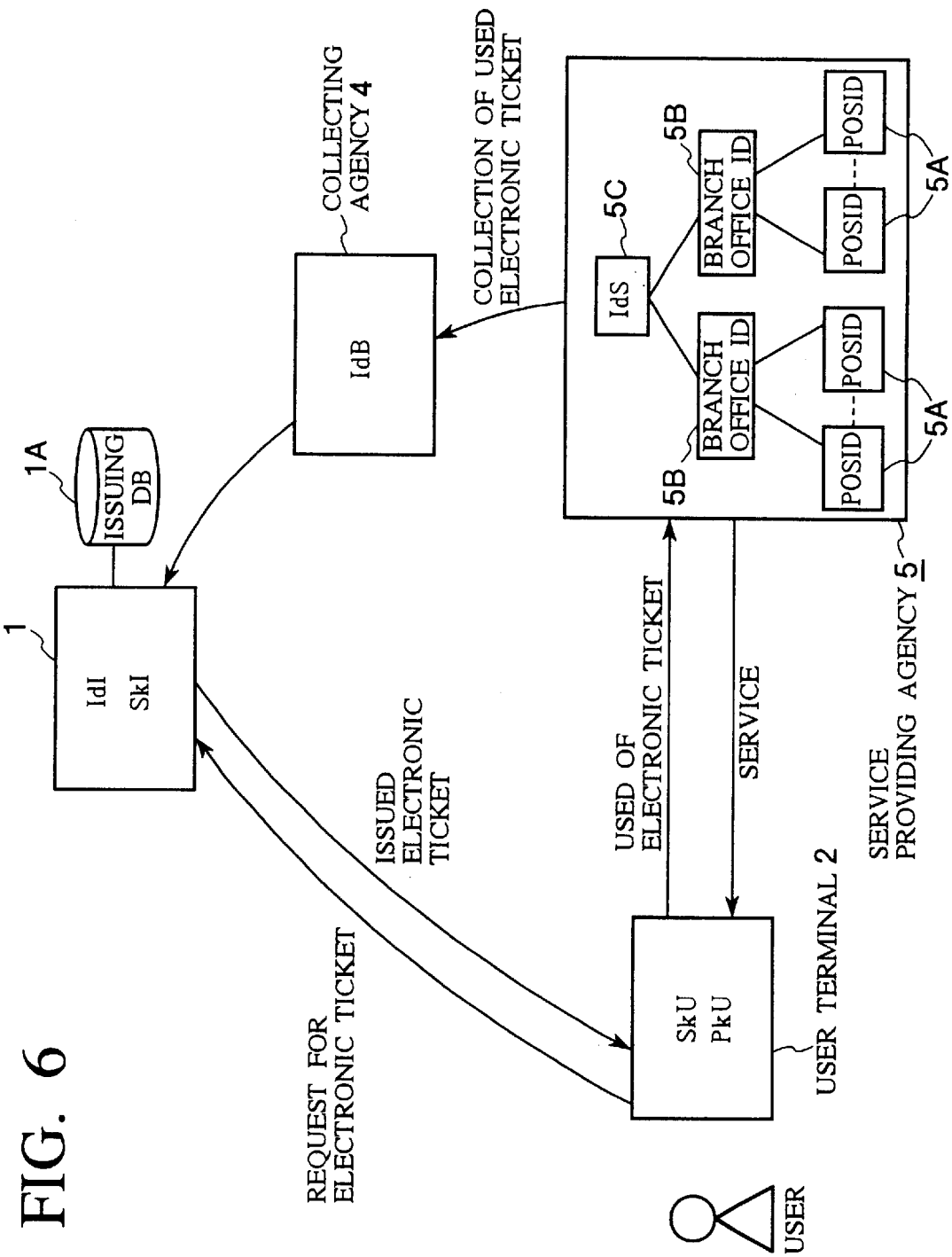
FIG. 6 is a diagram which schematically illustrates an electronic ticket system according to the second embodiment of the present invention.

The electronic ticket system according to the second embodiment has the issuing agency 1, the user terminal 2, the service providing agency 5 and the collecting agency 4, as illustrated in FIG. 6.

The issuing agency 1, the user terminal 2 and the collecting agency 4 have the same structures as those of the first embodiment. The service providing agency 5 includes the POS terminals 5A installed in the branch offices, the branch office control terminals 5B for controlling the POS terminals 5A installed in the branch offices, and the main office control terminal 5C for controlling the branch office control terminals 5B.

The POS terminals 5A store POS IDs for identifying themselves, while the branch office control terminal 5B store branch IDs for identifying themselves. The main office control terminal 5C stores the service provider name IdS for identifying the service providing agency 5.

When the main office control terminal 5C receives a money bag number Gb from the collecting agency 4, the main office control terminal 5C informs the branch control terminals 5B, which are hierarchically below the main office control terminal 5C, of the money bag number Gb and a main office collecting number Gb0. The main office control terminal 5C generates the main office collecting number Gb0 by affixing its own ID and its own management number to the money bag number Gb.

Each branch control terminal 5B informs the corresponding POS terminals 5A, which are hierarchically below the branch control terminals 5B, of the money bag number Gb and a branch office collecting number Gb1. Each branch control terminal SB generates the branch office collecting number Gb1 by affixing its own ID and its own management number to the main office collecting number GbO received from the main office control terminal 5C.

Each POS terminal 5A generates a POS collecting number Gb2 by affixing its own POS ID and its own management number to the branch office collecting number Gb1 received from the corresponding branch office control terminal 5B.

The system of the second embodiment differs from the electronic ticket system of the first embodiment in the point that the service providing agency 5 has the hierarchical structure. In the system of the second embodiment, used electronic tickets, received by one POS terminal 5A from the user terminal 2, are collected by the corresponding branch control terminal 5B which is hierarchically above the POS terminals 5A. The used electronic tickets collected by each branch control terminal 5B are further collected by the main office control terminal 5C which is hierarchically above the branch control terminals 5B, and are sent to the collecting agency 4.

In view of the above-described difference, the ticket using process and the ticket collecting process, etc. carried by the electronic ticket system of the second embodiment will now be described. The ticket issuing process and the ticket charge paying process of the second embodiment are the same as those of the first embodiment.

Figure 7:
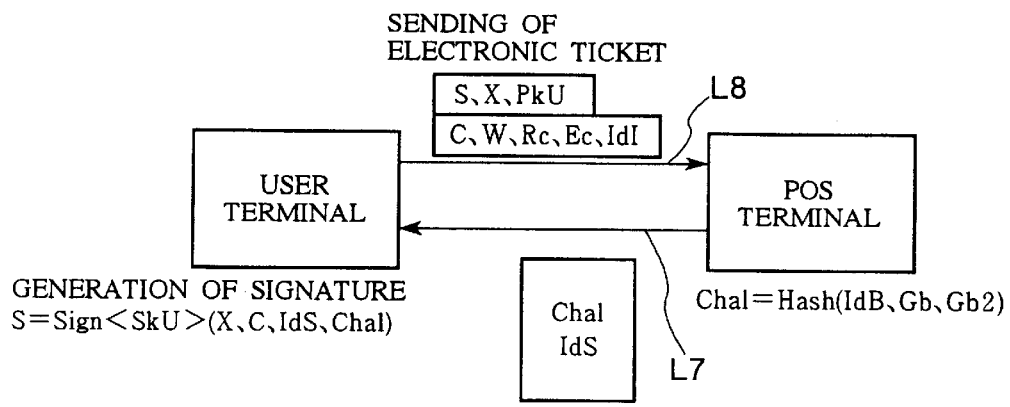
FIG. 7 is a diagram for explaining the ticket using process carried out by the electronic ticket system illustrated in FIG. 6.
Figure 8:
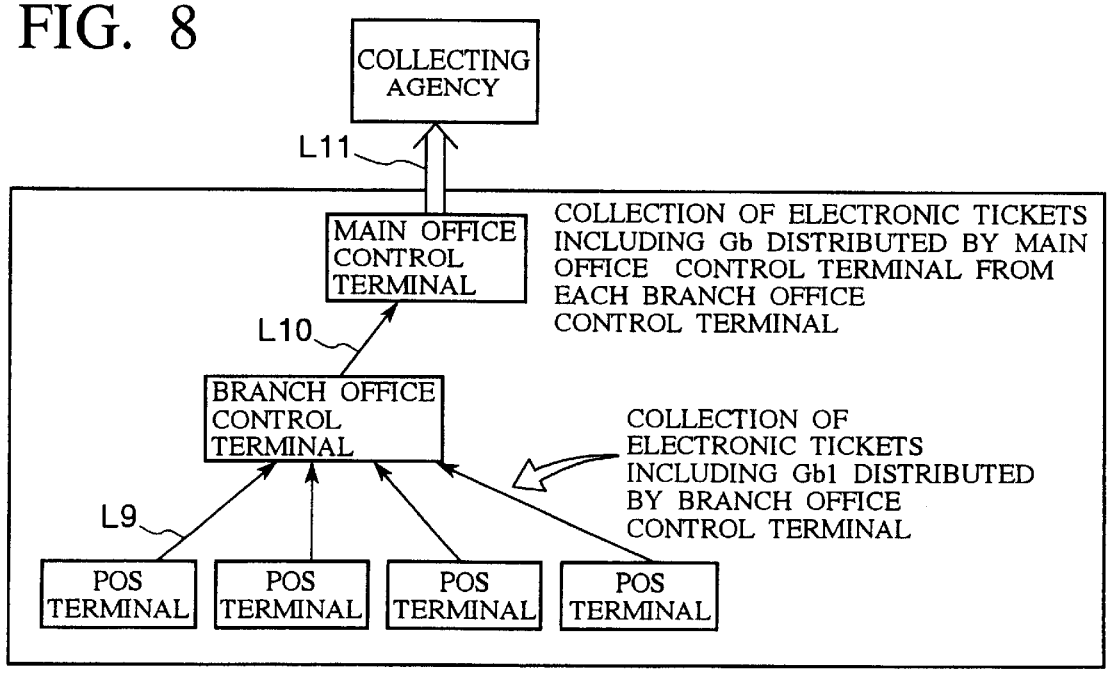
FIG. 8 is a diagram for explaining the ticket collecting process carried out by the electronic ticket system illustrated in FIG. 6.

First of all, the ticket using process carried out by the POS terminals 5A will now be described with reference to FIG. 7.

Before using an electronic ticket, the user terminal 2 acquires the challenge information Chal and the service provider name IdS from one POS terminal 5A with which the user terminal 2 intends to perform a deal (L7). In the challenge information Chal mentioned here, information which contains the collecting agency name IdB and the money bag number Gb, both supplied in advance to the aforementioned POS terminal through the corresponding branch office control terminal 5B, and the POS collecting number Gb2, is hashed using one-way hash functions or the like.

Since the above-described challenge information Chal contains the POS collecting number Gb2 to which the money bag number Gb, the branch office ID, the POS ID, etc. have been affixed, the amount of data is larger than m the case of the money bag number used in the first embodiment. However, by virtue of the use of the hash functions, etc. the amount of challenge information Chal is constant.

The user terminal 2 generates the signature S (=Sign <SkU> (X, C, IdS, Chal)) through utilization of predetermined information and its own private key SkU. This predetermined information contains the signature C included in the electronic ticket of the user terminal 2, the challenge information Chal and the service provider name IdS as received, and the ticket's monetary amount X. Then, the user terminal 2 sends the signature S, its own public key PkU, the monetary amount X and the electronic ticket {C, W, Rc, Ec, IdI} to the POS terminal 5A (L8).

The POS terminal 5A verifies the signature C of the electronic ticket by using the public key PkI of the issuing agency 1, and verifies the signature S by using the user private key PkU. After the verification of the signatures S and C, the POS terminal 5A provides the user terminal 2 with, for example, services or the like.

The user terminal 2 uses the electronic ticket in the above-described manner.

Explanations will now be made to the ticket collecting process by which the service providing agency 5 collects used tickets hierarchically, groups them together and sends them to the collecting agency 4.

First, each branch control terminal 5B collects used electronic tickets from the corresponding POS terminals 5A (L9). In this case, each branch control terminal 5B collects all the used electronic tickets dealt utilizing the POS collecting numbers Gb2 each containing the branch office collecting number Gb1 which each branch control terminal 5B has supplied to the corresponding POS terminals 5A. Each POS terminal 5A groups such electronic tickets together, and sends thus grouped electronic tickets to the corresponding branch control terminal B. The POS terminals 5A, after having sent the used electronic tickets, do not reuse the POS collecting numbers Gb2 contained therein.

Each branch control terminal 5B collects, of the used electronic tickets received from the corresponding POS terminals 5A, those electronic tickets which have the identical branch office collecting numbers Gb1 into one group, and sends the grouped electronic tickets to the main office control terminal 5C (L10). The branch control terminals 5B, after having sent the electronic tickets, do not reuse the branch office collecting numbers Gb1 contained therein.

The main office control terminal 5C collects, of the used electronic tickets received from the branch office control terminals 5B, those electronic tickets which have the identical money bag numbers Gb into one group, and sends the grouped electronic tickets to the collecting agency 4 (L11). The main office control terminal 5C, after having sent the electronic tickets, does not reuse the money bag numbers Gb contained therein.

In response, the collecting agency 4 ascertains whether the money bag numbers Gb contained in the used electronic tickets as received are proper. More specifically, the collecting agency 4 ascertains whether the money bag numbers Gb are identical with each other and that the money bag numbers are ones supplied to the service providing agency 3 and which have not yet been returned to the issuing agency 1, etc. For example, in the case where the money bag numbers Gb are those assigned to a group of electronic tickets which have already been returned to the issuing agency 1, or in the case where the money bag numbers Gb are not ones supplied to the service providing agency 5, the collecting agency 4 determines that the money bag numbers Gb are improper.

The collecting agency 4 further ascertains whether there are no identical electronic tickets in the received group of used electronic tickets. In other words, the collecting agency 4 ascertains whether the used electronic tickets include no electronic tickets created by copying or the like.

Moreover, the collecting agency 4 checks and verifies the signatures S and C of the used electronic tickets as received.

For example, by sorting the used electronic tickets, the collecting agency 4 can easily ascertain whether there are no identical electronic tickets in the received group of electronic tickets.

Thus, the electronic ticket system which includes the service providing agency 5 having the hierarchical structure can also carry out the ticket issuing process, the ticket using process, the ticket collecting process and the ticket charge paying process, as well as the system of the first embodiment.

In order to reduce the used electronic tickets which remain uncollected, the POS terminals 5A may update the money bag numbers, etc. before collecting the used electronic tickets, and there may be a predetermined time interval between the time when the POS terminals 5A perform deals with the user terminal 2 and the time when the used electronic tickets utilized for the deals are collected.

The branch office control terminals 5B and the main office control terminal 5C, etc. may also verify the signatures S and C and check the branch office collecting numbers Gb1, the POS collecting numbers Gb2, etc.

Figure 9:
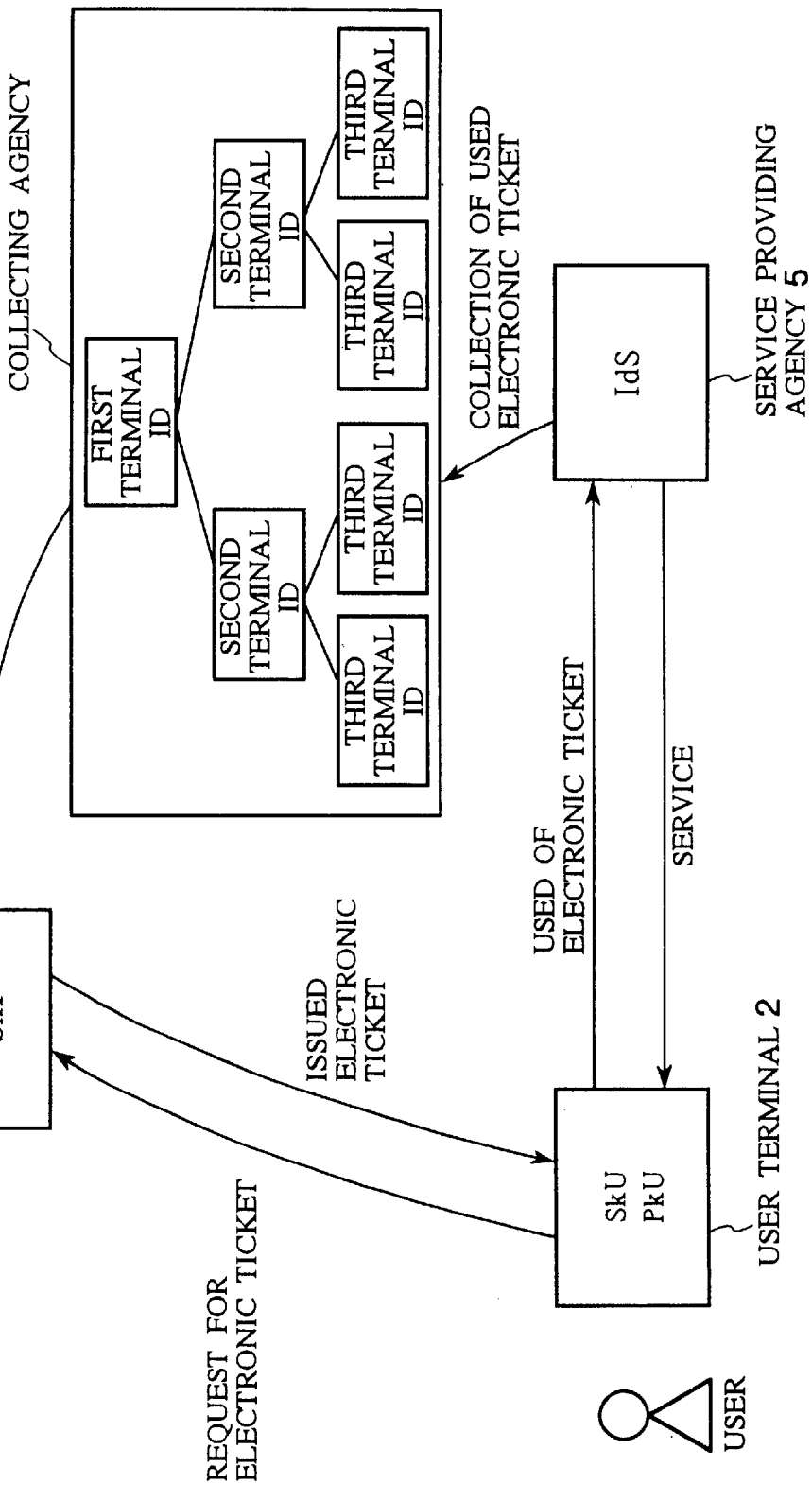
FIG. 9 is a diagram which schematically shows the structure of the system when the collecting agency has a hierarchical structure.

Furthermore, as illustrated in FIG. 9, the collecting agency 4 may also have the hierarchical structure, as well as the service providing agency 5. In this case also, the electronic ticket system can handle the electronic tickets in the same manner as the system of the first embodiment. For example, the collecting agency 4 is divided into a plurality of organizations whose commercial interests are different from each other, and the illegal actions such as copying the electronic tickets can be prevented between those organizations.

Figure 10:
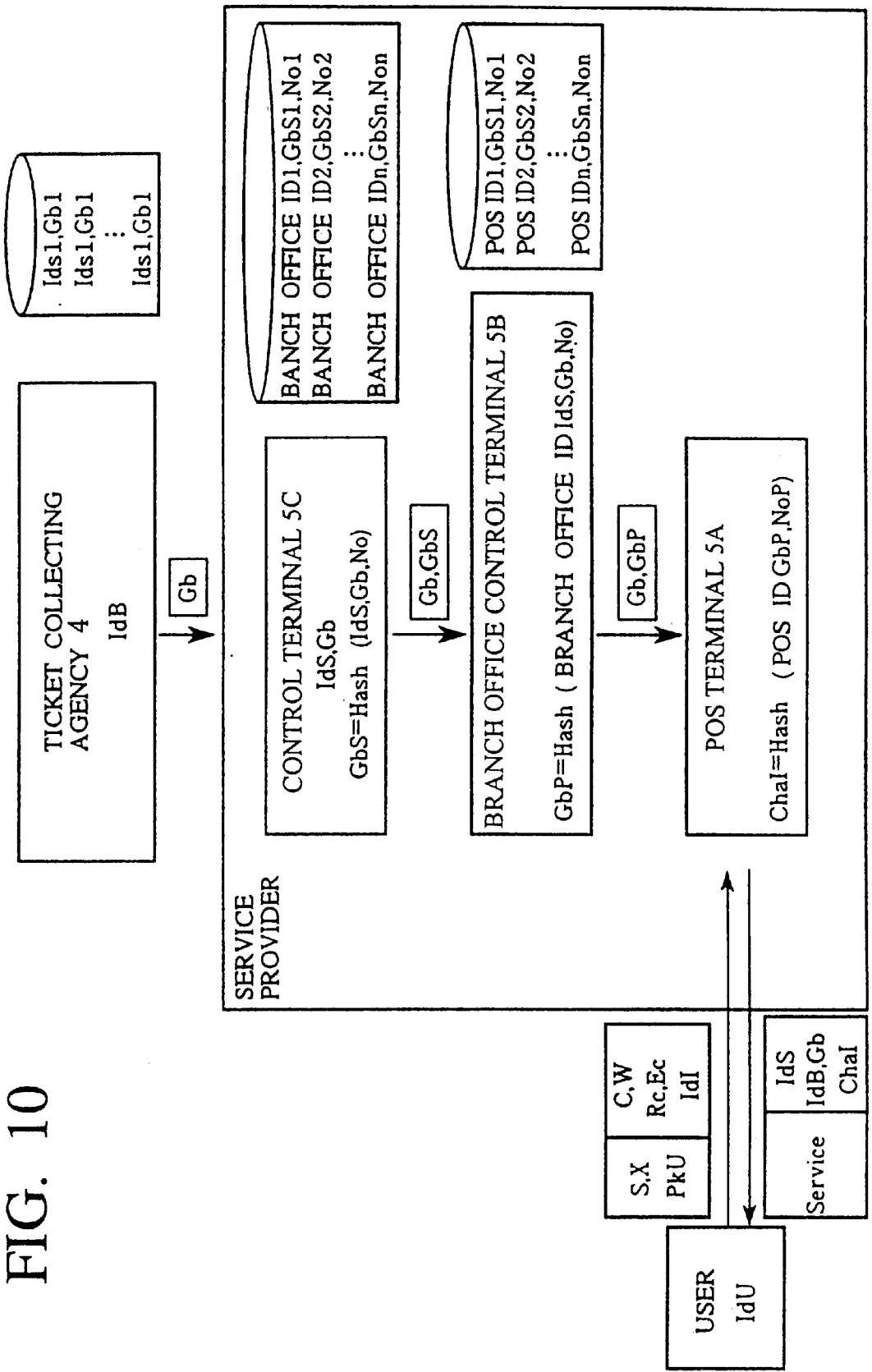
FIG. 10 is a diagram for explaining another method for generating a money bag number.

A method for generating a money bag number to be exchanged between the hierarchically arranged terminals is not limited to the above and is arbitrary. For example, as illustrated in FIG. 10, one terminal may hash a money bag number, an ID and a management number received from another terminal located at a hierarchically higher level, and may supply the hash of the money bag number, the ID and the management number to another terminal located at a hierarchically lower level as a money bag number. FIG. 10 illustrates an example of the money bag number used in the service providing terminal 3. The same method as that shown in FIG. 10 can be adopted in the collecting agency 4.

Moreover, the collecting agency 4 may simultaneously supply a plurality of money bag numbers Gb to each service providing terminal 3 or agency 5, and each service providing terminal 3 or agency 5 may use the received money bag numbers Gb in a predetermined order.

A method for updating the money bag number Gb may be predetermined between the collecting agency 4 and each service providing terminal 3 or agency 5. In this case, the collecting agency 4 and each service providing terminal 3 or agency 5 may update the money bag number Gb.

The one-way functions, used in the challenge information supplied from the service providing terminal 3 to the user terminal 2, are not limited to the hash functions and are arbitrary.

The service providing terminal 3 or the POS terminals 5A may check the term of validity Ec contained in the an electronic ticket received from the user terminal 2, in order to restrict the use of the electronic ticket.

For example, time information including date and time, etc. can be used as the money bag number, and the date included in the time information may be used as the ticket collecting due date. In this case, any used electronic ticket sent from the service providing terminal 3 or the service providing agency 5 after the aforementioned due date may not be accepted. Moreover, the money bag number may be a combination of the time information and a serial number, or may be any symbol or the like.

The money bag number sent from the collecting agency 4 may be unique to each of the service providing terminals 3.

A plurality of sequenced money bag numbers may be employed. In this case, the collection of electronic tickets is performed per sequence.

According to the above explanations, a single money bag number is used to collect electronic tickets once. However, a single money bag number can be used to collect electronic tickets a number of times. In this case, it is necessary to set the term of validity to the money bag number or inform the service providing terminal 3 or agency 5 of the final collection. Further, the collecting agency 4 needs to send collected electronic tickets to the issuing agency 1 and to check them with other electronic tickets having the identical money bag numbers and which have already been returned to the issuing agency 1.

The signature of the collecting agency 4 may be affixed to the money bag number.

Figure 11:
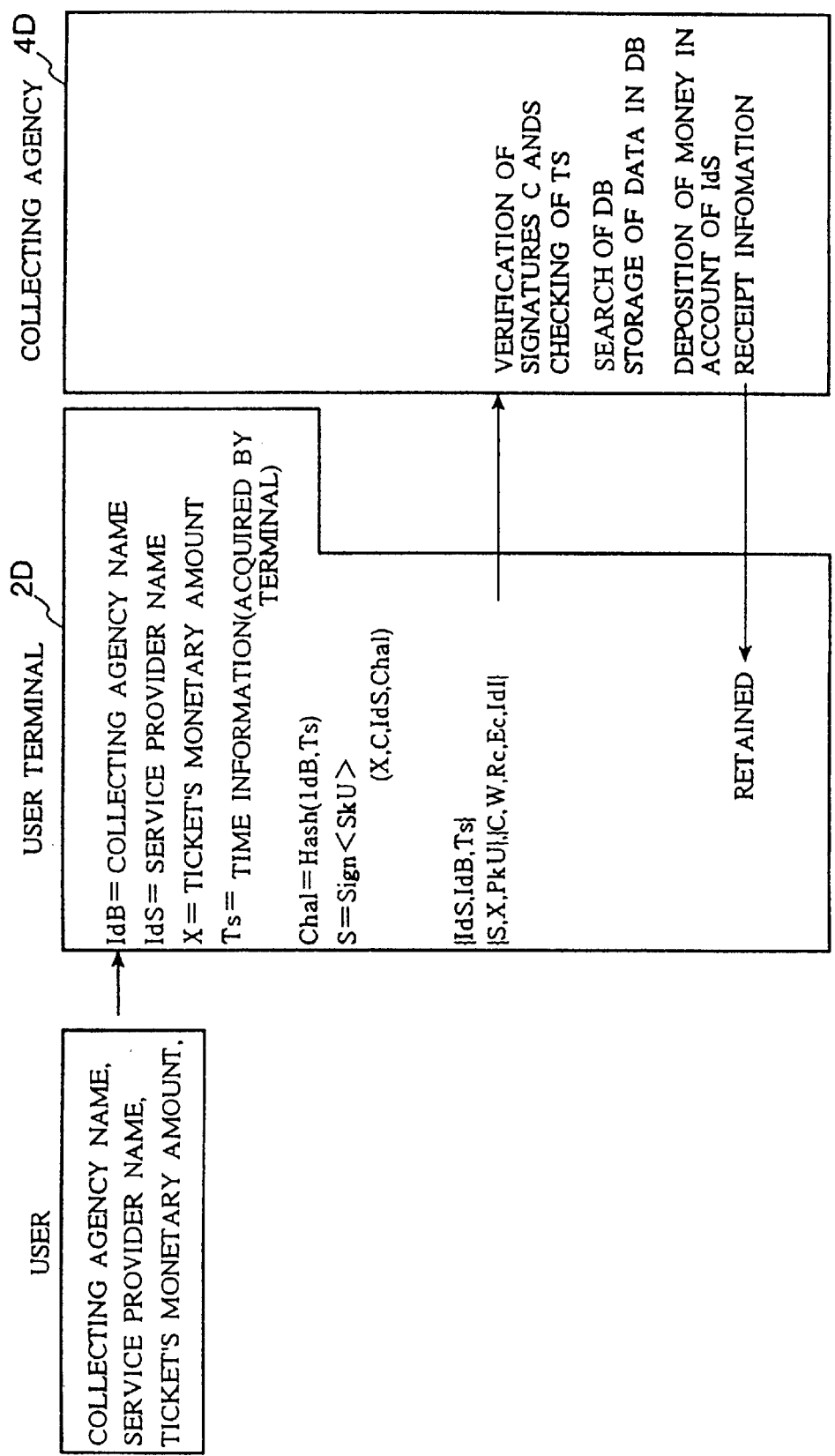
FIG. 11 is a diagram for explaining the operations of a collecting agency and a user terminal when the collecting agency collects an electronic ticket directly from the user terminal.

Moreover, the collecting agency may collect electronic tickets directly from the user terminal and deposit the charges for the electronic tickets in, for example, the bank account of the service providing agency after the collecting agency ascertains that the collected electronic tickets are proper. The ticket using process and the ticket collecting process, etc., which are carried out by a user terminal 2D and a collecting agency 4D of the electronic ticket system in the above case, will now be described with reference to FIG. 11.

In order to use an electronic ticket, the user inputs, to the user terminal 2D, the collecting agency name IdB of the collecting agency 4D which is the destination of the electronic ticket, the service provider name IdS of the service providing agency to which the charge for the electronic ticket is to be paid, and the ticket's monetary amount X.

In response, the user terminal 2D acquires time information Ts from a non-illustrated timer, and generates the challenge information Chal by applying the one-way hash functions to information which contains the time information Ts and the collecting agency name Id. Furthermore, the user terminal 2D generates the signature S (=Sign <SkU> (X, C, IdS, Chal)) through utilization of the generated challenge information Chal, the ticket's monetary amount X, the signature C contained in the electronic ticket and the service provider name IdS. Then, the user terminal 2D sends the generated signature S, its own public key PkU, the ticket's monetary amount X, the electronic ticket {C, W, Rc, Ec, IdI}, the collecting agency name IdB and the service provider name IdS input by the user, and the time information Ts to the collecting agency 4D.

When the collecting agency 4D receives the electronic ticket, etc. from the user terminal 2D, the collecting agency 4D verifies the signature C of the electronic ticket by using the public key PkI of the issuing agency, and verifies the signature S by using the user public key PkU. Further, the collecting agency 4D performs a predetermined checking process with respect to the received time information Ts. In this checking process, the collecting agency 4D checks, for example, whether a difference between the time specified by the time information Ts and the time preset in the collecting agency 4D is equal to or shorter than a predetermined length of time (e.g. one hour). The collecting agency 4D has a database DB which stores all electronic tickets received within a predetermined period (e.g. a period between the point in time which is one hour before the preset time and the point in time which is one hour after the preset time). The collecting agency 4D checks the signatures S, C and the time information Ts of the received electronic ticket, and thereafter searches the DB in order to check the presence/absence of double use, that is, whether the same electronic ticket as the received electronic ticket has not been used previously. When the collecting agency 4D determines as a result of the search that the same electronic ticket as the received electronic ticket has not been used previously, then the collecting agency 4D stores the received electronic ticket in the DB.

In the above-described manner, the user terminal 2D uses the electronic ticket, and the collecting agency 4D collects the electronic ticket.

After storing the received electronic ticket in the DB, the collecting agency 4D pays a predetermined amount of money to the service providing agency which is specified by the service provider name IdS affixed to the electronic ticket. Furthermore, the collecting agency 4D generates a signature by digitally signing, with its own private key, etc., predetermined information which contains the signature S affixed to the received electronic ticket and so on. The collecting agency 4D returns receipt information which contains the generated signature to the user terminal 2D.

The user terminal 2D may retain the receipt information received from the collecting agency 4D, in order to utilize it an acknowledgment for the sending of the electronic ticket. For example, if any trouble happens as regards the sending of the electronic ticket, the user terminal 2D can utilize the receipt information for search.

Figure 12:
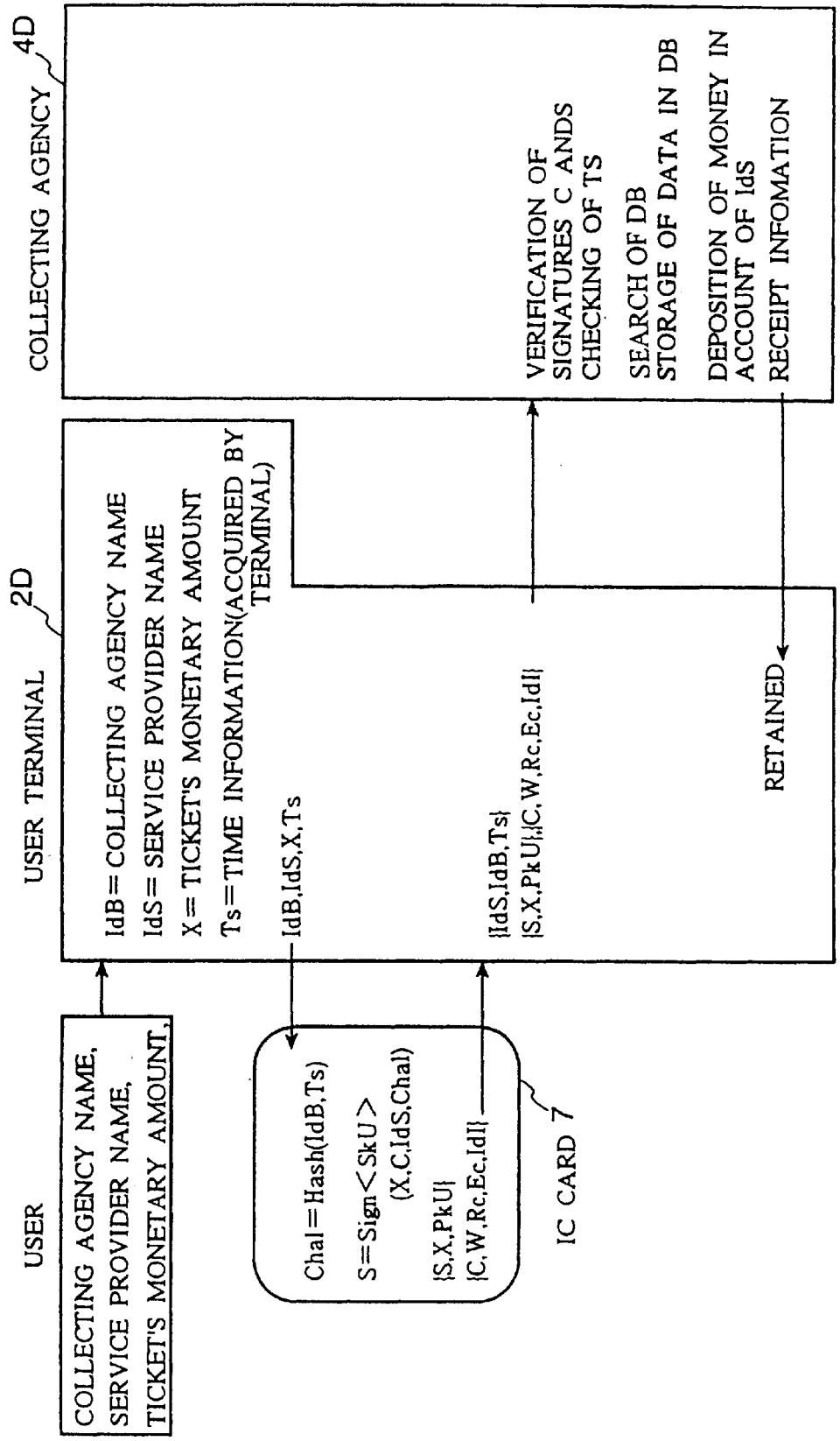
FIG. 12 is a diagram for explaining transactions carried out through utilization of an electronic IC card when the user terminal includes the IC card.

The user terminal 2D may include an IC card 7, in which information such as the electronic ticket and the user private key SkU, etc. have been stored, and may have a card handling function and a communications function. In this case, as illustrated in FIG. 12, the IC card 7 may perform processes which require a high order of confidentiality, such as a process for generating the challenge information, a process for generating the signature, etc. Moreover, as in the case of the first and second embodiments, information such as the electronic ticket, etc. may be stored in the IC card 7, and the IC card 7 may perform the processes like the signature generating process, etc.

The present invention can be realized also as an electronic ticket system which uses no money bag number. In this case, the collecting agency 4 supplies the collecting agency name to the service providing terminal 3, and the service providing agency 3 generates the challenge information through utilization of the collecting agency name and sends the generated challenge information to the user terminal 2. The user terminal 2 generates the signature including the challenge information, and sends the generated signature to the service providing terminal 3, together with the electronic ticket to be used. The service providing terminal 3 sends the received electronic ticket with the signature to the collecting agency 4 which is specified by the collecting agency name included in the signature. The collecting agency 4 stores, for example, information concerning all electronic tickets received from the service providing terminal 3. When the collecting agency 4 receives the electronic ticket with the signature from the service providing terminal 3, the collecting agency 4 detects the presence/absence of double use by determining whether the received electronic ticket is identical with any one of the electronic tickets which the collecting agency 4 has received before from the service providing terminal 3. A method for detecting the presence/absence of double use is not limited to one explained above, and is arbitrary.

The "deal" mentioned herein is not limited to giving and receiving money and article, and comprehends giving and receiving information. An electronic ticket, which is utilized in the electronic ticket system, is not limited to one having a monetary value like electronic money or the like, and may be one having no monetary value, such as an entrance ticket, a ballot, a pari-mutual ticket or the like.

The collecting agency 4 may include any computer installed in a financial agency or institution such as a bank, a post office, a credit union or the like. The electronic ticket system of the present invention is not limited to a dedicated system, and can be realized using an ordinary computer system. The user terminal, the service providing terminal, the collecting agency, etc., which execute the above-described processes, can be realized by installing programs for carrying out the above-described processes into computers from any medium (a floppy disk, a CD-ROM, etc.) which stores the programs. In the case where the aforementioned processes are executed through utilization of any OS or a combination of an OS and an application, software other than the OS may only be stored in the medium.

The medium for supplying the programs to computers may be a communications medium (a medium which temporarily retains the programs, like a communications line, a communications network an a communication system). For example, the programs may be presented on the bulletin board of the communications network and may be supplied to the computers via the network.

Then, the above programs are activated and executed under the control of the OS so as to carry out the above-described processes, as well as other application programs.

Thus, according to the present invention, before using an electronic ticket, the user terminal acquires information concerning the collecting terminal for collecting the electronic ticket after used, information pertaining to a to-be-collected group (money bag) to which the electronic ticket belongs, etc. The user terminal affixes the acquired information to the electronic ticket to be used, and sends the electronic ticket to the service providing terminal, as explained previously. By so doing, the electronic ticket after used is collected in accordance with the information affixed to the electronic ticket. Consequently, even if the electronic ticket should be collected improperly by the illegal actions such as stealing, the illegal actions can be easily detected by reference to the information affixed to the electronic ticket.

What is claimed is:

1. An electronic ticket system comprising:
   at least one user terminal which stores an electronic ticket;
   at least one service providing terminal for performing a deal with said at least one user terminal; and
   a financial agency in which the electronic money after used for the deal is deposited;
   wherein said at least one service providing terminal includes sending means for sending challenge information which differ depending on deals to said at least one user terminal in response to a dealing request therefrom, and
   said at least one user terminal includes acquiring means for acquiring, before the deal, account information identifying an account which said at least one service providing terminal has opened with said financial agency and in which the electronic ticket is deposited, generating means for generating an assignment which specifies an electronic ticket's monetary amount, an electronic ticket's destination which is the account identified by the acquired account information, and a dealing ID code including the challenge information sent to said at least one user terminal, and ticket sending means for affixing the generated assignment to the electronic ticket to be used for the deal and sending the electronic ticket with the assignment to said at least one service providing terminal.

2. An electronic ticket system for collecting electronic tickets in accordance with money bag numbers serving as collection ID information, comprising:
   user terminals which store the electronic tickets;
   at least one service providing terminal for performing deals with said user terminals; and
   at least one collecting terminal for collecting the electronic tickets after used for the deals; and
   wherein said at least one service providing terminal includes request information sending means for sending request information to said user terminals in response to dealing requests therefrom, said request information containing a collecting terminal ID code which identifies said at least one collecting terminal, and a money bag number which serves as the collection ID information,
   each of said user terminals includes signature generating means for generating a digital signature which contains the request information sent from said at least one service providing terminal, and ticket sending means for affixing the signature generated by said signature generating means to an electronic ticket to be used for a deal and for sending the electronic ticket with the generated signature to said at least one service providing terminal, and
   said at least one service providing terminal includes used ticket sending means for collecting, of the electronic tickets sent from said used terminals, electronic tickets with digital signatures which contain identical money bag numbers, and for sending the collected electronic tickets to said at least one collecting terminal which is identified by the collecting terminal ID code contained in said digital signatures.

3. The electronic ticket system according to claim 2, wherein said at least one collecting terminal includes supplying means for supplying the collecting terminal ID code and the money bag number to said at least one service providing terminal.

4. The electronic ticket system according to claim 3, wherein:
   said supplying means of said at least one collecting terminal includes storage means for storing the money bag number which said supplying means has sent to said at least one service providing terminal; and
   said at least one collecting terminal further includes money bag number checking means for checking, by reference to said storage means, whether the money bag numbers, contained in the digital signatures affixed to the electronic tickets collected and sent from said at least one service providing terminal, are identical with the money bag number sent to said at least one service providing terminal and have not been used before, and ticket checking means for checking whether the electronic tickets collected and sent from said at least one service providing terminal include no identical electronic tickets.

5. The electronic ticket system according to claim 3, wherein:
   said at least one service providing terminal includes a plurality of service providing terminals which are hierarchically arranged in first to m-th levels (m is a natural number);
   of said plurality of service providing terminals, a first level service providing terminal located in the first level in hierarchy includes means for supplying, to second level service providing terminals located in the second level in hierarchy, the collecting terminal ID code and the money bag number supplied from said at least one collecting terminal;
   each of n-th level service providing terminals located in an n-th level in hierarchy (n is a natural number given as $2 \leq n \leq m-1$) includes means for affixing an n-th level terminal ID code identifying each said n-th level service providing terminal to the money bag number supplied from a corresponding (n−1)-th level service providing terminal located in an (n−1)-th level in hierarchy, and supplying the money bag number having the n-th level terminal ID code assigned thereto to a corresponding (n+1)-th level service providing terminal located in an (n+1)-level in hierarchy as an n-th level terminal money bag number assigned to each said n-th level service providing terminal, together with the collecting terminal ID code;

each of m-th level service providing terminals located in an m-th level in hierarchy includes request information sending means for affixing an m-th level terminal ID code identifying each said m-th level service providing terminal to the money bag number supplied from a corresponding (m−1)-th level service providing terminal located in an (m−1)-th level in hierarchy, thereby generating an m-th level terminal money bag number assigned to each said m-th level service providing terminal, and for supplying request information containing the collecting terminal ID code and the generated money bag number to one of said user terminals in response to a dealing request therefrom;

each said n-th level service providing terminal further includes means for collecting from said corresponding (n+1)-th level service providing terminal the electronic tickets with digital signatures including the n-th level terminal money bag number after said m-th level service providing terminals have performed deals with said user terminals, and for sending the collected electronic tickets to said corresponding (n−1)-th level service providing terminal; and the first level service providing terminal further includes means for collecting from the second level service providing terminals the electronic tickets with digital signatures including the money bag number which the first level service providing terminal has sent to the second level service providing terminals, and for sending the collected electronic tickets to said at least one collecting terminal which is identified by the collecting terminal ID code contained in the digital signatures affixed to the collected electronic tickets.

6. The electronic ticket system according to claim 5, wherein said request information sending means of said at least one service providing terminal further includes means for generating the request information by applying one-way hash functions to information which contains the collecting terminal ID code and the money bag number.

7. The electronic ticket system according to claim 3, wherein:

said at least one collecting terminal includes a plurality of collecting terminals which are hierarchically arranged in first to m-th levels (m is a natural number);

of said plurality of collecting terminals, a first level collecting terminal located in the first level in hierarchy includes means for supplying, to second level collecting terminals located in the second level in hierarchy, a collecting terminal ID code which identifies the first level collecting terminal and a collection money bag number which serves as collection ID information;

each of n-th level collecting terminals located in an n-th level in hierarchy (n is a natural number given as 2≦n≦m−1) includes means for affixing an n-th level terminal ID code identifying each said n-th level collecting terminal to the collection money bag number supplied from a corresponding (n−1)-th level collecting terminal located in an (n−1)-th level in hierarchy, and for supplying the collection money bag number having the n-th level terminal ID code affixed thereto to a corresponding (n+1)-th collecting terminal located in an (n+1)-level in hierarchy as an n-th level terminal collection money bag number assigned to each said n-th level collecting terminal, together the collecting terminal ID code;

each of m-th level collecting terminals located in an m-th level in hierarchy includes means for affixing an m-th level terminal ID code identifying each said m-th level collecting terminal to the collection money bag number supplied from a corresponding (m−1)-th level collecting terminal located in an (m−1)-th level in hierarchy, and for supplying as the money bag number the collection money bag number having the m-th level terminal ID code affixed thereto to said at least one service providing terminal, together with the collecting terminal ID code;

each said n-th level collecting terminal further includes means for collecting from said corresponding (n+1)-th collecting terminal the electronic tickets with digital signatures including the n-th level terminal collection money bag number after said m-th level collecting terminals have received the electronic tickets from said at least one service providing terminal, and for sending the collected electronic tickets to said corresponding (n−1)-th level collecting terminal; and the first level collecting terminal collects from the second level collecting terminals the electronic tickets with digital signatures including the collection money bag number which the first level collecting terminal has sent to the second level collecting terminals.

8. The electronic ticket system according to claim 7, wherein said request information sending means of said at least one service providing terminal further includes means for generating the request information by applying one-way hash functions to information which contains the collecting terminal ID code and the money bag number.

9. The electronic ticket system according to claim 2, wherein each of said user terminals includes:

an IC card which stores at least one of an electronic ticket and a private key for use in generating a digital signature; and means for sending the electronic ticket through utilization of information stored in said IC card.

10. The electronic ticket system according to claim 2, wherein:

said electronic ticket system further comprises an issuing terminal for issuing electronic tickets;

said at least one collecting terminal includes returning means for returning collected electronic tickets to said issuing terminal; and said issuing terminal includes issuing storage means for storing information pertaining to the issued electronic tickets, and ticket discriminating means for discriminating whether the electronic tickets returned from said returning means are proper.

11. The electronic ticket system according to claim 2, wherein the electronic tickets have a monetary value.

12. An electronic ticket system for collecting electronic tickets in accordance with money bag numbers serving as collection ID information, comprising:

user terminals which store the electronic tickets;

at least one service providing terminal for performing deals with said user terminals; and at least one collecting terminal for collecting the electronic tickets after used for the deals;

wherein said at least one collecting terminal includes supplying means for supplying a collecting terminal ID code identifying said at least one collecting terminal to said at least one service providing terminal, and generating means for generating a money bag number which serves as the collection ID information in accordance with a predetermined rule, said at least one service providing terminal includes request information sending means for generating a money bag number in accordance with a rule identical with the predetermined rule of said at least one collecting terminal and for sending request information, which contains the generated money bag number and the collecting terminal ID code supplied from said at least one collecting terminal, to said user terminals in response to dealing requests therefrom, each of said user terminals includes signature generating means for generating a digital signature containing said request information sent from said at least one service providing terminal, and ticket sending means for affixing the signature generated by said signature generating means to an electronic ticket to be used for a deal and for sending the electronic ticket with the generated signature to said at least one service providing terminal, and said at least one service providing terminal includes used ticket sending means for collecting, of the electronic tickets sent from said used terminals, electronic tickets with digital signatures containing identical money bag numbers, and for sending the collected electronic tickets to said at least one collecting terminal which is identified by the collecting terminal ID code contained in said digital signatures.

13. The electronic ticket system according to claim 12, wherein said at least one collecting terminal further includes money bag number checking means for checking whether the money bag numbers, contained in the digital signatures affixed to the electronic tickets collected and sent from said at least one service providing terminal, have not been used before and are identical with the money bag number which said generating means has generated in accordance with the predetermined rule, and ticket checking means for checking whether the electronic tickets collected and sent from said at least one service providing terminal include no identical electronic tickets.

14. The electronic ticket system according to claim 12, wherein:

said at least one service providing terminal includes a plurality of service providing terminals which are hierarchically arranged in first to m-th levels (m is a natural number);

of said plurality of service providing terminals, a first level service providing terminal located in the first level in hierarchy includes means for supplying, to second level service providing terminals located in the second level in hierarchy, the money bag number generated in accordance with the rule identical with the predetermined rule of said at least one collecting terminal, and the collecting terminal ID code supplied from said at least one collecting terminal;

each of n-th level service providing terminals located in an n-th level in hierarchy (n is a natural number given as 2≦n≦m−1) includes means for affixing an n-th level terminal ID code identifying each said n-th level service providing terminal to the money bag number supplied from a corresponding (n−1)-th level service providing terminal located in an (n−1)-th level in hierarchy, and for supplying the money bag number having the n-th level terminal ID code affixed thereto to a corresponding (n+1)-th service providing terminal located in an (n+1)-level in hierarchy as an n-th level terminal money bag number assigned to each said n-th level service providing terminal, together with the collecting terminal ID code;

each of m-th level service providing terminals located in an m-th level in hierarchy includes request information sending means for affixing an m-th level terminal ID code identifying each said m-th level service providing terminal to the money bag number supplied from a corresponding (m−1)-th level service providing terminal located in an (m−1)-th level in hierarchy, thereby generating an m-th level terminal money bag number assigned to each said m-th level service providing terminal, and for supplying request information which includes the collecting terminal ID code and the generated money bag number to one of said user terminals in response to a dealing request therefrom;

each said n-th level service providing terminal further includes means for collecting from said corresponding (n+1)-th level service providing terminal the electronic tickets with digital signatures including the n-th level terminal money bag number after said m-th level service providing terminals have performed deals with said user terminals, and for sending the collected electronic tickets to said corresponding (n−1)-th level service providing terminal; and the first level service providing terminal further includes means for collecting from the second level service providing terminals the electronic tickets with digital signatures including the money bag number which the first level service providing terminal has sent to the second level service providing terminals, and for sending the collected electronic tickets to said at least one collecting terminal which is identified by the collecting terminal ID code contained in the digital signatures affixed to the collected electronic tickets.

15. The electronic ticket system according to claim 14, wherein said request information sending means of said at least one service providing terminal further includes means for generating the request information by applying one-way hash functions to information which contains the collecting terminal ID code and the money bag number.

16. The electronic ticket system according to claim 12, wherein:

said at least one collecting terminal includes a plurality of collecting terminals which are hierarchically arranged in first to m-th levels (m is a natural number);

of said plurality of collecting terminals, a first level collecting terminal located in the first level in hierarchy includes means for supplying, to second level collecting terminals located in the second level in hierarchy, a collecting terminal ID code identifying the first level collecting terminal and a collection money bag number which serves as collection ID information;

each of n-th level collecting terminals located in an n-th level in hierarchy (n is a natural number given as 2≦n≦m−1) includes means for affixing an n-th level terminal ID code identifying each said n-th level collecting terminal to the collection money bag number supplied from a corresponding (n−1)-th level collecting terminal located in an (n−1)-th level in hierarchy, and for sending the collection money bag number having the n-th level terminal ID code affixed thereto to a corresponding (n+1)th collecting terminal located in an (n+1)-level in hierarchy as an n-th level terminal collection money bag number assigned to each said n-th level collecting terminal, together with the collecting terminal ID code;

each of m-th level collecting terminals located in an m-th level in hierarchy includes means for affixing an m-th level terminal ID code identifying each said m-th level collecting terminal to the collection money bag number supplied from a corresponding (m−1)-th level collecting terminal located in an (m−1)-th level in hierarchy, and for storing as the money bag number the collection money bag number having the m-th level terminal ID code affixed thereto, and for supplying the collecting terminal ID code to said at least one service providing terminal;

each said n-th level collecting terminal further includes means for collecting from said corresponding (n+1)-th collecting terminal the electronic tickets with digital signatures including the n-th level terminal collection money bag number after said m-th level collecting terminals have received the electronic tickets from said at least one service providing terminal, and for sending the collected electronic tickets to said corresponding (n−1)-th level collecting terminal; and the first level collecting terminal collects from the second level collecting terminals the electronic tickets with digital signatures including the collection money bag number which the first level collecting terminal has sent to the second level collecting terminals.

17. The electronic ticket system according to claim 16, wherein said request information sending means of said at least one service providing terminal further includes means for generating the request information by applying one-way hash functions to information which contains the collecting terminal ID code and the money bag number.

18. The electronic ticket system according to claim 12, wherein each of said user terminals includes:
an IC card which stores at least one of an electronic ticket and a private key for use in generating a digital signature; and
means for sending the electronic ticket through utilization of information stored in said IC card.

19. The electronic ticket system according to claim 12, wherein:
said electronic ticket system further comprises an issuing terminal for issuing electronic tickets;
said at least one collecting terminal includes returning means for returning collected electronic tickets to said issuing terminal; and
said issuing terminal includes issuing storage means for storing information pertaining to the issued electronic tickets, and ticket discriminating means for discriminating whether the electronic tickets returned from said returning means are proper.

20. The electronic ticket system according to claim 12, wherein the electronic tickets have a monetary value.

21. An electronic ticket system comprising:
user terminals which store electronic tickets; and
at least one collecting terminal for collecting the electronic tickets;
wherein each of said user terminals includes signature generating means for generating a digital signature which contains a money bag number, serving as collection ID information and including time information, and sending means for affixing the signature generated by said signature generating means to an electronic ticket to be used for a deal and for sending the electronic ticket with the generated signature to said at least one collecting terminal, and said at least one collecting terminal includes storage means for storing electronic tickets which said at least one collecting terminal has received within a predetermined period, money bag number checking means for checking whether the time information, included in money bag numbers contained in digital signatures affixed to the electronic tickets sent from said user terminals, specifies time within said predetermined period, and double use checking means for checking whether the electronic tickets sent from said user terminals include no electronic tickets identical with the electronic tickets stored in said storage means.

22. An electronic ticket system comprising:
user terminals which store electronic tickets;
at least one service providing terminal for performing deals with said user terminals; and
at least one collecting terminal for collecting the electronic tickets after used for the deals;
wherein said at least one service providing terminal includes request information sending means for sending request information, containing a collecting terminal ID code which identifies said at least one collecting terminal, to said user terminals in response to dealing requests therefrom, each of said user terminals includes signature generating means for generating a digital signature containing the request information sent from said at least one service providing terminal, and ticket sending means for affixing the signature generated by said signature generating means to an electronic ticket to be used for a deal and for sending the electronic ticket with the generated signature to said at least one service providing terminal, and said at least one service providing terminal includes used ticket sending means for sending the electronic tickets received from said user terminals to said at least one collecting terminal which is identified by the collecting terminal ID code contained in digital signatures affixed to the electronic tickets.

23. The electronic ticket system according to claim 22, wherein said at least one collecting terminal includes ticket checking means for checking whether the electronic tickets received from said user terminals include no electronic tickets identical with electronic tickets which said at least one collecting terminal has collected before.

24. A collecting terminal for collecting used electronic tickets in an electronic ticket system which comprises:
user terminals which store electronic tickets; and
at least one service providing terminal for performing deals with said user terminals by using the electronic tickets;
wherein said collecting terminal includes
supplying means for supplying a collecting terminal ID code which identifies said collecting terminal and a money bag number which serves as collection ID information to said at least one service providing terminal,
storage management means for storing and managing the money bag number supplied to said at least one service providing terminal, collecting means for collecting the electronic tickets after used for the deals from said at least one service providing terminal, money bag checking means for checking, by reference to information stored in said storage management means, whether money bag numbers contained in digital signatures affixed to the electronic tickets collected by said collecting means are identical with the money bag number supplied to said at least one service providing terminal and have not been used before, and ticket checking means for checking whether the electronic tickets collected by said collecting means include no identical electronic tickets.

25. The collecting terminal according to claim 24, wherein the electronic tickets have a monetary value.

26. A collecting terminal for collecting used electronic tickets in an electronic ticket system which comprises:

user terminals which store electronic tickets; and at least one service providing terminal for performing deals with said user terminals by using the electronic tickets;

wherein said collecting terminal includes supplying means for supplying a collecting terminal ID code which identifies said collecting terminal to said at least one service providing terminal, generating means for generating, in accordance with a predetermined rule, a money bag number which serves as collection ID information, storage management means for storing and managing the money bag number generated by said generating means, collecting means for collecting the electronic tickets after used for the deals from said at least one service providing terminal, money bag number checking means for checking, by reference to information stored in said storage management means, whether money bag numbers contained in digital signatures affixed to the electronic tickets collected by said collecting means are identical with the money bag number generated by said generating means and have not been used before, and ticket checking means for checking whether the electronic tickets collected by said collecting means include no identical electronic tickets.

27. The collecting terminal according to claim 26, wherein the electronic tickets have a monetary value.

28. A collecting terminal for collecting used electronic tickets in an electronic ticket system which comprises:

user terminals which store electronic tickets; and at least one service providing terminal for performing deals with said user terminals by using the electronic tickets;

wherein said collecting terminal includes collecting means for collecting the electronic tickets after used for the deals from said at least one service providing terminal, and ticket checking means for checking whether the electronic tickets collected by said collecting means include no identical electronic tickets.

29. A service providing terminal for performing deals with user terminals by using electronic tickets in an electronic ticket system which comprises:

the user terminals which store the electronic tickets; and at least one collecting terminal for collecting the electronic tickets after used for the deals;

wherein said at least one service providing terminal includes request information sending means for sending request information, containing a collecting terminal ID code which identifies said at least one collecting terminal and a money bag number which serves as collection ID information, to said user terminals in response to dealing requests therefrom, ticket receiving means for receiving electronic tickets having digital signatures assigned thereto from said user terminals, said digital signatures containing the request information sent from said request information sending means, and used ticket sending means for collecting, of the electronic tickets received from said user terminals, electronic tickets with digital signatures containing identical money bag numbers, and for sending the collected electronic tickets to said at least one collecting terminal which is identified by the collecting terminal ID code contained in the digital signatures affixed to the collected electronic tickets.

30. The service providing terminal according to claim 29, further including receiving means for receiving from said at least one collecting terminal the collecting terminal ID code identifying said at least one collecting terminal.

31. The service providing terminal according to claim 29, wherein the electronic tickets have a monetary value.

32. A service providing terminal for performing deals with user terminals by using electronic tickets in an electronic ticket system which comprises:

said user terminals which store the electronic tickets; and at least one collecting terminal for collecting the electronic tickets after used for the deals;

wherein said at least one service providing terminal includes receiving means for receiving from said at least one collecting terminal a collecting terminal ID code which identifies said at least one collecting terminal, generating means for generating a money bag number which serves as collection ID information, in accordance with a rule identical with a generation rule employed in said at least one collecting terminal, request information sending means for sending request information to said user terminals in response to dealing requests therefrom, said request information containing the collecting terminal ID code received from said at least one collecting terminal and the money bag number generated by said generating means, ticket receiving means for receiving electronic tickets having digital signatures assigned thereto from said user terminals, said digital signatures containing the request information sent from said request information sending means, and used ticket sending means for collecting, of the electronic tickets received from said user terminals, electronic tickets with digital signatures containing identical money bag numbers, and for sending the collected electronic tickets to said at least one collecting terminal which is identified by the collecting terminal ID code contained in the digital signatures affixed to the collected electronic tickets.

33. The service providing terminal according to claim 32, wherein the electronic tickets have a monetary value.

34. A service providing terminal for performing deals with user terminals by using electronic tickets in an electronic ticket system which comprises:

said user terminals which store the electronic tickets; and at least one collecting terminal for collecting the electronic tickets after used for the deals;

wherein said at least one service providing terminal includes receiving means for receiving from said at least one collecting terminal a collecting terminal ID code which identifies said at least one collecting terminal, request information sending means for sending request information to said user terminals in response to dealing requests therefrom, said request information containing the collecting terminal ID code received from said at least one collecting terminal, ticket receiving means for receiving electronic tickets having digital signatures assigned thereto from said user terminals, said digital signatures containing the request information sent from said request information sending means, and used ticket sending means for sending the electronic tickets received from said user terminals to said at least one collecting terminal which is identified by the collecting terminal ID code contained in the digital signatures affixed to the received electronic tickets.

35. A user terminal for performing a deal with at least one service providing terminal in an electronic ticket system which comprises:

said at least one service providing terminal for performing the deal with said user terminal by using an electronic ticket; and at least one collecting terminal for collecting the electronic ticket after used for the deal;

wherein said user terminal includes request information receiving means for requesting and receiving request information, containing a collecting terminal ID code and a money bag number, from said at least one service providing terminal before the deal, said collecting terminal ID code identifying said at least one collecting terminal by which the electronic ticket after used for the deal is to be collected, and said money bag number serving as collection ID information, signature generating means for generating a digital signature containing the request information received by said request information receiving means, and ticket sending means for affixing the signature generated by said signature generating means to the electronic ticket to be used for the deal, and for sending the electronic ticket with the generated signature to said at least one service providing terminal.

36. The user terminal according to claim 35, further including:

an IC card which stores at least one of the electronic ticket and a private key for use in generating the digital signature; and means for sending the electronic ticket through utilization of information stored in said IC card.

37. A user terminal for performing a deal with at least one service providing terminal in an electronic ticket system which comprises:

said at least one service providing terminal for performing the deal with said user terminal by using an electronic ticket; and at least one collecting terminal for collecting the electronic ticket after used for the deal;

wherein said user terminal includes request information receiving means for requesting and receiving request information containing a collecting terminal ID code from said at least one service providing terminal before the deal, said collecting terminal ID code identifying said at least one collecting terminal by which the electronic ticket after used for the deal is to be collected, signature generating means for generating a digital signature containing the request information received by said request information receiving means, and ticket sending means for affixing the signature generated by said signature generating means to the electronic ticket to be used for the deal, and for sending the electronic ticket with the generated signature to said at least one service providing terminal.

38. The user terminal according to claim 36, further including:

an IC card which stores at least one of the electronic ticket and a private key for use in generating the digital signature; and means for sending the electronic ticket through utilization of information stored in said IC card.

39. An electronic ticket collecting method for collecting electronic tickets used in an electronic ticket system, said method comprising:

a request information sending step of sending, from at least one service providing agency to users, request information containing a money bag number which serves as collection ID information and a collecting agency ID code which identifies at least one collecting agency, in response to dealing requests from the users;

a ticket sending step of receiving the request information sent by said request information sending step, generating digital signatures containing the request information, affixing the generated signatures to the electronic tickets to be used for deals, and sending the electronic tickets with the generated signatures to said at least one service providing agency; and a ticket collecting step of collecting, of the electronic tickets sent by said ticket sending step, electronic tickets with digital signatures containing identical money bag numbers, and sending the collected electronic tickets to said at least one collecting agency which is identified by the collecting agency ID code contained in the digital signatures affixed to the collected electronic tickets.

40. The electronic ticket collecting method according to claim 39, further comprising:

a supplying step of supplying the collecting agency ID code and the money bag number to said at least one service providing agency before said request information sending step;

a checking step of checking whether the money bag numbers, contained in the digital signatures affixed to the electronic tickets sent to said at least one collecting agency, are identical with the money bag number supplied by said supplying step and have not been used before, and checking whether the electronic tickets sent to said at least one collecting agency include no identical electronic tickets.

41. The electronic ticket collecting method according to claim 39, wherein:

said at least one service providing agency includes a plurality of service providing terminals which are hierarchically arranged in first to m-th levels (m is a natural number);

said sending step includes steps of
supplying the collecting agency ID code and the money bag number, from a first level service providing terminal located in the first level in hierarchy to second level service providing terminals located in the second level in hierarchy among said plurality of service providing terminals, in each of n-th level service providing terminals located in an n-th level in hierarchy (n is a natural number given as $2 \leq n \leq m-1$), affixing an n-th level terminal ID code identifying each said n-th level service providing terminal to the money bag number supplied from a corresponding (n−1)-th level service providing terminal located in an (n−1)-th level in hierarchy, and supplying the money bag number having the n-th level terminal ID code affixed thereto to a corresponding (n+1)-th service providing terminal located in an (n+1)-level in hierarchy as an n-th level terminal money bag number assigned to each said n-th level service providing terminal, together with the collecting agency ID code, and in each of m-th level service providing terminals located in an m-th level in hierarchy, affixing an m-th level terminal ID code identifying each said m-th level service providing terminal to the money bag number supplied from a corresponding (m−1)-th level service providing terminal located in an (m−1)-th level in hierarchy, thereby generating an m-th level terminal money bag number assigned to each said m-th level service providing terminal, and supplying request information which includes the collecting agency ID code and the generated money bag number to one of the users in response to a dealing request therefrom; and said ticket collecting step includes steps of
in each said n-th level service providing terminal, collecting from said corresponding (n+1)-th level service providing terminal the electronic tickets with digital signatures including the n-th level terminal money bag number after said m-th level service providing terminals have performed deals with the users, and sending the collected electronic tickets to said corresponding (n−1)-th level service providing terminal, and in the first level service providing terminal, collecting from the second level service providing terminals the electronic tickets with digital signatures including the money bag number which the first level service providing terminal has sent to the second level service providing terminals, and sending the collected electronic tickets to said at least one collecting agency which is identified by the collecting agency ID code contained in the digital signatures affixed to the collected electronic tickets.

42. The electronic ticket collecting method according to claim 39, wherein:
said at least one collecting agency includes a plurality of collecting terminals which are hierarchically arranged in first to m-th levels (m is a natural number);
said supplying step includes steps of
supplying, from a first level collecting terminal located in the first level in hierarchy to second level collecting terminals located in the second level in hierarchy among said plurality of collecting terminals, a collecting terminal ID code which identifies the first level collecting terminal and a collection money bag number which serves as collection ID information, in each of n-th level collecting terminals located in an n-th level in hierarchy (n is a natural number given as $2 \leq n \leq m-1$), affixing an n-th level terminal ID code identifying each said n-th level collecting terminal to the collection money bag number supplied from a corresponding (n−1)-th level collecting terminal located in an (n−1)-th level in hierarchy, and supplying the collection money bag number having the n-th level terminal ID code affixed thereto to a corresponding (n+1)-th collecting terminal located in an (n+1)-level in hierarchy as an n-th level terminal collection money bag number assigned to each said n-th level collecting terminal, together with the collecting terminal ID code, and in each of m-th level collecting terminals located in an m-th level in hierarchy, affixing an m-th level terminal ID code identifying each said m-th level collecting terminal to the collection money bag number supplied from a corresponding (m−1)-th level collecting terminal located in an (m−1)th level in hierarchy, and supplying the collection money bag number having the m-th level ID code affixed thereto to said at least one service providing agency as the money bag number, together with the collecting terminal ID code; and said electronic ticket collecting method further comprises steps of
in each said n-th level collecting terminal, collecting the electronic tickets with digital signatures including the n-th level terminal collection money bag number from said corresponding (n+1)-th collecting terminal after said m-th level collecting terminals have received the electronic tickets collected by said ticket collecting step, and sending the collected electronic tickets to said corresponding (n−1)-th level collecting terminal, and in the first level collecting terminal, collecting from the second level collecting terminals the electronic tickets with digital signatures including the collection money bag number which the first level collecting terminal has sent to the second level collecting terminals.

43. An electronic ticket collecting method for collecting electronic tickets after used for deals in a system which performs the deals by using the electronic tickets, said method comprising:

a supplying step of supplying a collecting agency ID code identifying at least one collecting agency to at least one service providing agency for performing deals;

a generating step of generating a money bag number which serves as collection ID information in accordance with a predetermined rule;

a sending step of generating a money bag number in said at least one service providing agency in accordance with a rule identical with the predetermined rule employed in said generating step, and sending request information, which contains the generated money bag number and the collecting agency ID code supplied by said supplying step, to users in response to dealing requests therefrom;

a ticket sending step of receiving the request information sent by said sending step, generating digital signatures containing the request information, affixing the generated signatures to the electronic tickets to be used for deals, and sending the electronic tickets with the generated signatures to said at least one service providing agency; and a ticket collecting step of collecting, of the electronic tickets sent by said ticket sending step, electronic tickets with digital signatures containing identical money bag numbers, and sending the collected electronic tickets to said at least one collecting agency which is identified by the collecting agency ID code contained in the digital signatures affixed to the collected electronic tickets.

44. The electronic ticket collecting method according to claim 43, further comprising:

a checking step of checking, in said at least one collecting agency, whether the money bag numbers contained in the digital signatures affixed to the electronic tickets collected from said at least one service providing agency are identical with the money bag number generated by said generating step and have not been used before, and whether the collected electronic tickets include no identical electronic tickets.

45. The electronic ticket collecting method according to claim 43, wherein:

said at least one service providing agency includes a plurality of service providing terminals which are hierarchically arranged in first to m-th levels (m is a natural number);

said sending step includes steps of supplying, from a first level service providing terminal located in the first level in hierarchy to second level service providing terminals located in the second level in hierarchy among said plurality of service providing terminals, the money bag number generated by said generating step and the collecting agency ID code supplied from said at least one collecting agency, in each of n-th level service providing terminals located in an n-th level in hierarchy (n is a natural number given as $2 \leq n \leq m-1$), affixing an n-th level terminal ID code identifying each said n-th level service providing terminal to the money bag number supplied from a corresponding (n−1)-th level service providing terminal located in an (n−1)-th level in hierarchy, and supplying the money bag number having the n-th level terminal ID code affixed thereto to a corresponding (n+1)-th service providing terminal located in an (n+1)-level in hierarchy as an n-th level terminal money bag number assigned to each said n-th level service providing terminal, together with the collecting agency ID code, and in each of m-th level service providing terminals located in an m-th level in hierarchy, affixing an m-th level terminal ID code identifying each said m-th level service providing terminal to the money bag number supplied from a corresponding (m−1)-th level service providing terminal located in an (m−1)-th level in hierarchy, thereby generating an m-th level terminal money bag number assigned to each said m-th level service providing terminal, and supplying request information which includes the collecting agency ID code and the generated money bag number to one of users in response to a dealing request therefrom; and said ticket collecting step includes steps of in each said n-th level service providing terminal, collecting from said corresponding (n+1)-th level service providing terminal the electronic tickets with digital signatures including the n-th level terminal money bag number after said m-th level service providing terminals have performed deals with the users, and sending the collected electronic tickets to said corresponding (n−1)-th level service providing terminal, and in the first level service providing terminal, collecting from the second level service providing terminals the electronic tickets with digital signatures including the money bag number which the first level service providing terminal has sent to the second level service providing terminals, and sending the collected electronic tickets to said at least one collecting agency which is identified by the collecting agency ID code contained in the digital signatures affixed to the collected electronic tickets.

46. The electronic ticket collecting method according to claim 43, wherein:

said at least one collecting agency includes a plurality of collecting terminals which are hierarchically arranged in first to m-th levels (m is a natural number);

said supplying step includes steps of supplying, from a first level collecting terminal located in the first level in hierarchy to second level collecting terminals located in the second level in hierarchy among said plurality of collecting terminals, a collecting terminal ID code which identifies the first level collecting terminal and a collection money bag number which serves as collection ID information, in each of n-th level collecting terminals located in an n-th level in hierarchy (n is a natural number given as $2 \leq n \leq m-1$), affixing an n-th level terminal ID code identifying each said n-th level collecting terminal to the collection money bag number supplied from a corresponding (n−1)-th level collecting terminal located in an (n−1)-th level in hierarchy, and supplying the collection money bag number having the n-th level terminal ID code affixed thereto to a corresponding (n+1)-th collecting terminal located in an (n+1)-level in hierarchy as an n-th level terminal collection money bag number assigned to each said n-th level collecting terminal, together with the collecting terminal ID code, and in each of m-th level collecting terminals located in an m-th level in hierarchy, affixing an m-th level terminal ID code identifying each said m-th level collecting terminal to the collection money bag number supplied from a corresponding (m−1)-th level collecting terminal located in an (m−1)-th level in hierarchy, and storing as the money bag number the collection money bag number having the m-th level ID code affixed thereto, and supplying the collecting terminal ID code to said at least one service providing agency; and said electronic ticket collecting method further comprises steps of in each said n-th level collecting terminal, collecting the electronic tickets with digital signatures including the n-th level terminal collection money bag number from said corresponding (n+1)-th collecting terminal after said m-th level collecting terminals have received the electronic tickets collected by said ticket collecting step, and sending the collected electronic tickets to said corresponding (n−1)-th level collecting terminal, and in the first level collecting terminal, collecting from the second level collecting terminals the electronic tickets with digital signatures including the collection money bag number which the first level collecting terminal has sent to the second level collecting terminals.

47. An electronic ticket collecting method for collecting used electronic tickets in a system, said method comprising:
- a sending step of sending request information, which contains a collecting agency ID code identifying at least one collecting agency, to users in response to dealing requests therefrom;
- a ticket sending step of receiving the request information sent by said sending step, generating digital signatures containing the request information, affixing the generated signatures to electronic tickets to be used, and sending the electronic tickets with the generated signatures to said at least one service providing agency; and
- a ticket collecting step of collecting, of the electronic tickets sent by said ticket sending step, electronic tickets with digital signatures containing identical money bag numbers, and sending the collected electronic tickets to said at least one collecting agency which is identified by the collecting agency ID code contained in the digital signatures affixed to the collected electronic tickets.

48. The electronic ticket collecting method according to claim 47, further comprising:
- a ticket checking step of checking, in said at least one collecting agency, whether the electronic tickets sent by said ticket sending step include no identical electronic tickets.

49. A recording medium having programs recorded therein, said programs being readable by a computer and making said computer function as a collecting terminal in a system which comprises:
- user terminals which store electronic tickets;
- at least one service providing terminal for performing deals with said user terminals by using the electronic tickets; and
- said collecting terminal for collecting the electronic tickets after used for the deals;
- wherein said programs makes said computer function as
  - supplying means for supplying a collecting terminal ID code which identifies said collecting terminal and a money bag number which serves as collection ID information to said at least one service providing terminal,
  - storage management means for storing and managing the money bag number supplied from said supplying means to said at least one service providing terminal,
  - collecting means for collecting the electronic tickets after used for the deals from said at least one service providing terminal,
  - money bag number checking means for checking, by reference to information stored in said storage management means, whether money bag numbers contained in digital signatures affixed to the electronic tickets collected by said collecting means are identical with the money bag number supplied to said at least one service providing terminal and have not been used before, and
  - ticket checking means for checking whether the electronic tickets collected by said collecting means include no identical electronic tickets.

50. A recording medium having programs recorded therein, said programs being readable by a computer and making said computer function as a collecting terminal in a system which comprises:
- user terminals which store electronic tickets;
- at least one service providing terminal for performing deals with said user terminals by using the electronic tickets; and
- said collecting terminal for collecting the electronic tickets after used for the deals;
- wherein said programs makes said computer function as
  - collecting means for collecting the electronic tickets after used for the deals from said at least one service providing terminal,
  - money bag number checking means for checking whether money bag numbers, contained in digital signatures affixed to the electronic tickets collected by said collecting means, have not been used before, said money bag numbers serving as collection ID information, and
  - ticket checking means for checking whether the electronic tickets collected by said collecting means include no identical electronic tickets.

51. A recording medium having programs recorded therein, said programs being readable by a computer and making said computer function as a collecting terminal in a system which comprises:
- user terminals which store electronic tickets;
- at least one service providing terminal for performing deals with said user terminals by using the electronic tickets; and
- said collecting terminal for collecting the electronic tickets after used for the deals;
- wherein said programs makes said computer function as
  - storage management means for generating a money bag number which serves as collection ID information, and storing and managing the generated money bag number,
  - collecting means for collecting the electronic tickets after used for the deals from said at least one service providing terminal,
  - money bag number checking means for checking, by reference to information stored in said storage management means, whether money bag numbers contained in digital signatures affixed to the electronic tickets collected by said collecting means are identical with the money bag number generated by said storage management means and have not been used before, and
  - ticket checking means for checking whether the electronic tickets collected by said collecting means include no identical electronic tickets.

52. A recording medium having programs recorded therein, said programs being readable by a computer and making said computer function as a service providing terminal in a system which comprises:
- user terminals which store electronic tickets;
- said service providing terminal for performing deals with said user terminals by using the electronic tickets; and
- at least one collecting terminal for collecting the electronic tickets after used for the deals;
- wherein said programs makes said computer function as
  - request information sending means for sending request information, which contains a collecting terminal ID code identifying said at least one collecting terminal and a money bag number serving as collection ID information, to said user terminals,
  - ticket receiving means for receiving, from said user terminals, electronic tickets with digital signatures containing the request information sent from said request information sending means, and
  - used ticket sending means for collecting, of the electronic tickets received from said user terminals, electronic tickets with digital signatures containing identical money bag numbers, and for sending the collected electronic tickets to said at least one collecting terminal which is identified by the collecting terminal ID code contained in the digital signatures affixed to the collected electronic tickets.

53. A recording medium having programs recorded therein, said programs being readable by a computer and making said computer function as a service providing terminal in a system which comprises:

user terminals which store electronic tickets;

said service providing terminal for performing deals with said user terminals by using the electronic tickets; and at least one collecting terminal for collecting the electronic tickets after used for the deals;

wherein said programs makes said computer function as generating means for generating a money bag number which serves as collection ID information in accordance with a rule identical with a predetermined rule employed in said at least one collecting terminal, request information sending means for sending request information, which contains a collecting terminal ID number identifying said at least one collecting terminal and the money bag number generated by said generating means, to said user terminals in response to dealing requests therefrom, ticket receiving means for receiving, from said user terminals, electronic tickets with digital signatures containing the request information sent from said request information sending means, and used ticket collecting means for collecting, of the received electronic tickets, electronic tickets with digital signatures containing identical money bag numbers, and for sending the collected electronic tickets to said at least one collecting terminal which is identified by the collecting terminal ID code contained in the digital signatures affixed to the collected electronic tickets.

54. A recording medium having programs recorded therein, said programs being readable by a computer and making said computer function as a user terminal in a system which comprises:

at least one service providing terminal for performing deals by using the electronic tickets; and at least one collecting terminal for collecting the electronic tickets after used for the deals;

wherein said programs makes said computer function as request information receiving means for requesting and receiving request information, which contains a collecting terminal ID code and money bag number serving as collection ID information, from said at least one service providing terminal before the deals, the collecting terminal ID code identifying said at least one collecting terminal by which the electronic tickets after used for the deals are to be collected, signature generating means for generating digital signatures containing the request information received by said request information receiving means, and ticket sending means for affixing the signature generated by said signature generating means to the electronic tickets to be used for the deals, and for sending the electronic tickets with the generated signatures to said at least one service providing terminal.

* * * * *